(12) United States Patent
Aggarwal

(10) Patent No.: US 11,595,665 B2
(45) Date of Patent: Feb. 28, 2023

(54) UPSAMPLING REFERENCE PIXELS FOR INTRA-PREDICTION IN VIDEO CODING

(71) Applicant: QUALCOMM Incorporated, San Diego, CA (US)

(72) Inventor: Dhruv Aggarwal, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/174,176

(22) Filed: Feb. 11, 2021

(65) Prior Publication Data

US 2022/0394273 A1    Dec. 8, 2022

(51) Int. Cl.
*H04N 19/159* (2014.01)
*H04N 19/196* (2014.01)
*H04N 19/59* (2014.01)
*H04N 19/105* (2014.01)

(52) U.S. Cl.
CPC ......... *H04N 19/159* (2014.11); *H04N 19/105* (2014.11); *H04N 19/197* (2014.11); *H04N 19/59* (2014.11)

(58) Field of Classification Search
CPC .... H04N 19/159; H04N 19/157; H04N 19/59; H04N 19/105
See application file for complete search history.

(56) References Cited

U.S. PATENT DOCUMENTS

| | | | |
|---|---|---|---|
| 2007/0160133 A1* | 7/2007 | Bao | H04N 19/159 375/240.1 |
| 2013/0329782 A1 | 12/2013 | Seregin et al. | |
| 2015/0016501 A1* | 1/2015 | Guo | H04N 19/593 375/240.02 |
| 2015/0264365 A1* | 9/2015 | Tsai | H04N 19/94 375/240.03 |
| 2016/0373743 A1* | 12/2016 | Zhao | H04N 19/159 |
| 2017/0078683 A1* | 3/2017 | Seregin | H04N 19/463 |

(Continued)

FOREIGN PATENT DOCUMENTS

| | | |
|---|---|---|
| WO | 2018208349 A1 | 11/2018 |
| WO | 2020053394 A1 | 3/2020 |

(Continued)

OTHER PUBLICATIONS

De Rivaz P., et al., "AV1 Bitstream & Decoding Process Specification", Jan. 8, 2019, 681 pages.

(Continued)

*Primary Examiner* — Shawn S An
(74) *Attorney, Agent, or Firm* — Shumaker & Sieffert, P.A.

(57) ABSTRACT

A device for decoding video data includes a memory configured to store video data; and one or more processors implemented in circuitry and configured to: determine that a current block of the video data is to be predicted using an angular intra-prediction mode; determine neighboring samples to the current block that will be used to generate a prediction block for the current block according to an angle of the angular intra-prediction mode and that are to be upsampled; calculate predicted samples of the prediction block according to formulas that jointly upsample the neighboring samples that will be used to generate the prediction block and that generate the values for the predicted samples; and decode the current block using the prediction block.

30 Claims, 7 Drawing Sheets

(56) References Cited

U.S. PATENT DOCUMENTS

| | | | |
|---|---|---|---|
| 2019/0058891 A1 | 2/2019 | Lee et al. | |
| 2019/0124339 A1* | 4/2019 | Young | H04N 19/176 |
| 2019/0253706 A1 | 8/2019 | Zhao et al. | |
| 2020/0260077 A1 | 8/2020 | Hinz et al. | |
| 2020/0304832 A1 | 9/2020 | Ramasubramonian et al. | |
| 2021/0014531 A1* | 1/2021 | Pfaff | H04N 19/46 |

FOREIGN PATENT DOCUMENTS

| | | | | |
|---|---|---|---|---|
| WO | 2020139173 A1 | 7/2020 | | |
| WO | 2020257589 A1 | 12/2020 | | |
| WO | WO-2021040251 A1 * | 3/2021 | | H04N 19/117 |

OTHER PUBLICATIONS

Tu-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

International Search Report and Written Opinion—PCT/US2022/011833—ISA/EPO—Apr. 11, 2022, 13 pp.

Ray B (Qualcomm)., et al., "Unified PDPC for Angular Intra Modes", JVET-Q0391-v3, Joint Video Experts Team (JVET) of ITU-T SG 16 WP 3 and ISO/IEC JTC 1/SC 29/WG 11, 17th Meeting, Brussels, BE, Jan. 7-17, 2020, Jan. 8, 2020 (Jan. 8, 2020), m51986, XP030223398, pp. 1-7, Retrieved from the Internet: URL:http://phenix.int-evry.fr/vet/doc_end_user/documents/17_Brussels/wg11/JVET-Q0391-v3.zip, JVET-Q0391-v3/JVET-Q0391-v3.docx [retrieved on Jan. 8, 2020].

* cited by examiner

UPSAMPLING REFERENCE PIXELS FOR INTRA-PREDICTION IN VIDEO CODING

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra picture) prediction and/or temporal (inter picture) prediction to reduce or remove redundancy inherent in video sequences. For block-based video coding, a video slice or a video tile (e.g., a video picture or a portion of a video picture) may be partitioned into video blocks, which may also be referred to as coding blocks, superblocks, coding tree units (CTUs), coding units (CUs) and/or coding nodes. Video blocks in an intra coded (I) slice of a picture are encoded using spatial prediction with respect to reference samples (also called prediction samples) in neighboring blocks in the same picture. Video blocks in an inter coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to intra-prediction modes for video coding (encoding and decoding). In video coding, there are two types of prediction techniques: temporal prediction (inter-prediction) and spatial prediction (intra-prediction). Temporal prediction is based on exploiting similarities between a current picture and a reference picture, e.g., using motion vectors. The video coder may code the motion vectors to represent displacement of a current block between the two pictures. Spatial prediction is based on exploiting similarities within a current picture, e.g., between a current block and its previously coded neighborhood. In both temporal and spatial prediction, the video coder may further code residual data representing differences between the prediction and the actual block.

The AV1 codec (AOMedia Video 1) provides different methodologies, referred to as "intra-prediction modes," for predicting a current block. A video encoder may select a best performing intra-prediction mode for the current block (e.g., an intra-prediction mode that yields the least variation between an original version of the current block and a decoded version of the current block). The video coder may code mode information, neighbor pixel information, and other block characteristics as data in a bitstream. According to the techniques of this disclosure, a video coder (encoder or decoder) may perform intra-prediction using upsampled neighboring pixels (samples), without pre-calculating the upsampled values.

In one example, a method of decoding video data includes determining that a current block of video data is to be predicted using an angular intra-prediction mode; determining neighboring samples to the current block that will be used to generate a prediction block for the current block according to an angle of the angular intra-prediction mode and that are to be upsampled; calculating predicted samples of the prediction block according to formulas that jointly upsample the neighboring samples that will be used to generate the prediction block and that generate the values for the predicted samples; and decoding the current block using the prediction block.

In another example, a device for decoding video data includes a memory configured to store video data; and one or more processors implemented in circuitry and configured to: determine that a current block of the video data is to be predicted using an angular intra-prediction mode; determine neighboring samples to the current block that will be used to generate a prediction block for the current block according to an angle of the angular intra-prediction mode and that are to be upsampled; calculate predicted samples of the prediction block according to formulas that jointly upsample the neighboring samples that will be used to generate the prediction block and that generate the values for the predicted samples; and decode the current block using the prediction block.

In another example, a computer-readable storage medium has stored thereon instructions that, when executed, cause a processor to determine that a current block of video data is to be predicted using an angular intra-prediction mode; determine neighboring samples to the current block that will be used to generate a prediction block for the current block according to an angle of the angular intra-prediction mode and that are to be upsampled; calculate predicted samples of the prediction block according to formulas that jointly upsample the neighboring samples that will be used to generate the prediction block and that generate the values for the predicted samples; and decode the current block using the prediction block.

In another example, a device for decoding video data includes means for determining that a current block of video data is to be predicted using an angular intra-prediction mode; means for determining neighboring samples to the current block that will be used to generate a prediction block for the current block according to an angle of the angular intra-prediction mode and that are to be upsampled; means for calculating predicted samples of the prediction block according to formulas that jointly upsample the neighboring samples that will be used to generate the prediction block and that generate the values for the predicted samples; and means for decoding the current block using the prediction block.

The details of one or more examples are set forth in the accompanying drawings and the description below. Other features, objects, and advantages will be apparent from the description, drawings, and claims.

DETAILED DESCRIPTION

AV1 (AOMedia Video 1) is a video CODEC format introduced by Alliance for Open Media as a successor of VP9 format. The basic function of a video decoder is to read the input bitstreams, extract some properties, and re-create close to original frames (pictures). There are two main techniques for predicting frames (which are divided into blocks). In temporal prediction, similarities are exploited between a current frame and a reference frame (e.g., in the form of motion vectors). A video coder (encoder or decoder) may code differences in the form of motion vectors (how much each block in the current frame is displaced with respect to the reference frame). This is also called inter-frame coding. In spatial prediction, similarities are exploited within a frame, namely, between a current block and its previously coded neighborhood. The AV1 codec provides different methodologies called intra-prediction modes, from which a video encoder may select a best-performing mode to code the current block (usually the mode yielding the least variation between the original block and a decoded version of the block). The video coder may code mode information, neighbor pixel information, and other block characteristics in a bitstream.

In conventional AV1 intra-prediction (spatial prediction) techniques, a video coder upsamples neighboring values by a factor of 2. In this manner, the video coder may calculate predicted samples for a current block from twice as many neighboring samples as are actually present in the frame itself. This upsampling may lead to a more accurate prediction block calculated from the upsampled samples. However, because many intra-prediction modes are directional (i.e., angular), the upsampling may lead to many upsampled samples that are never used. Thus, there may be many calculations performed as part of the upsampling process that are effectively wasted computing cycles.

The techniques of this disclosure may be performed to avoid wasting computing cycles in this manner. Accordingly, the techniques of this disclosure may reduce the demands placed on processing elements of the video coder (which may improve performance speed, reduce power consumption, and reduce heat generation) and reduce demands placed on memory for storing unnecessarily upsampled values. In this manner, the techniques of this disclosure may improve efficiencies in terms of chip area and processor cycles for hardware implementations.

Figure 1:
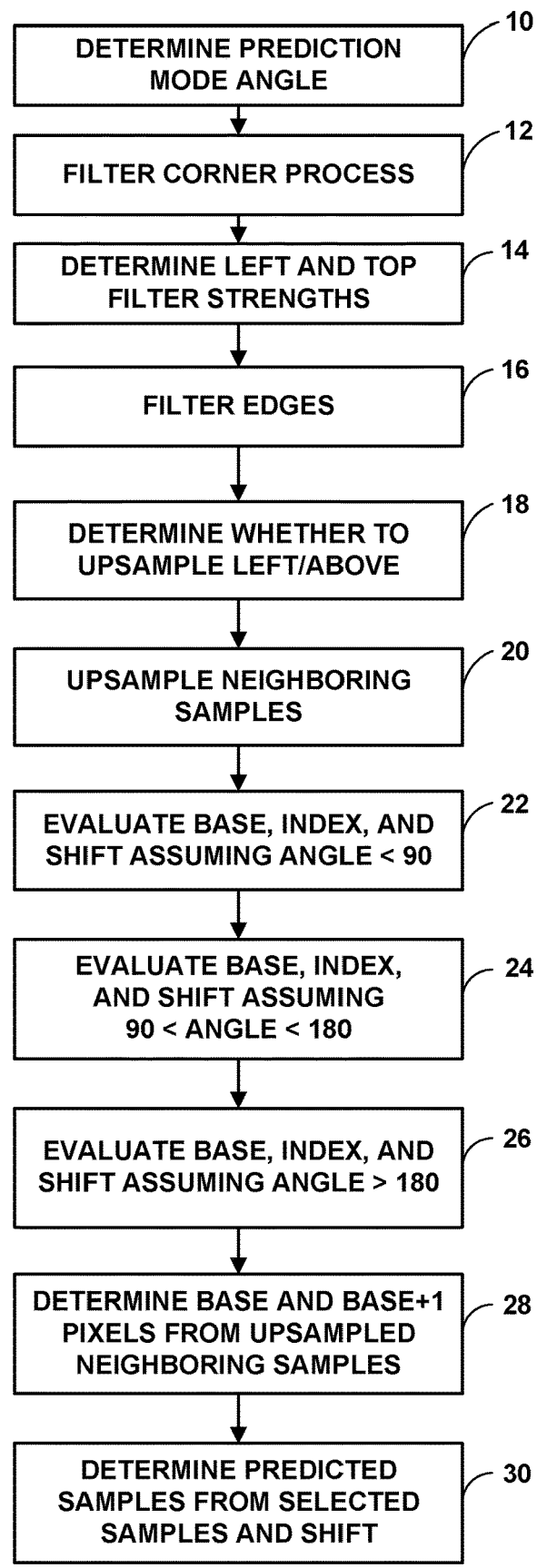
FIG. 1 is a flowchart illustrating an example technique for performing intra-prediction according to AV1.

FIG. 1 is a flowchart illustrating an example technique for performing intra-prediction according to AV1. An AV1 codec (encoder/decoder) may be configured to perform the method of FIG. 1. Initially, the AV1 codec determines a prediction mode angle (10). The prediction mode angle may be referred to as pAngle in some instances. The AV1 codec may further determine, when performing spatial (intra-) prediction, quantized and inverse-transformed residual values (i.e., pixel differences with the same block in the original frame) stored for the current block, block dimensions, neighbor availability, and values of available neighbor pixels at the top, top-right, left, top-left, and bottom-left of the current block.

Using the neighbor pixels and prediction mode, the AV1 codec may generate predicted pixels of a generated prediction block. The AV1 codec may add the predicted pixels with the residual values to form the final pixels of the current, decoded block. The final pixels may be referred to as reconstructed pixels.

The AVI codec may then perform a filter corner process (12). That is, for the directional (i.e., angular) prediction mode, the AV1 codec may determine a base angle (or the mode, which can be indicated by the angle) and an Angle-Delta value associated with the base angle (for each of luma and chroma components of the current block). The AV1 codec may also receive an indication of whether an intra-edge filter is enabled (enable_intra_edge_filter). The AV1 codec may also receive a one-bit FilterType value, which is 1 if the neighboring blocks use smooth prediction, and an ANGLE_STEP value, which may be multiplied by Angle-Delta.

The AV1 codec may also determine left-neighboring and top-neighbor filter strength values (14). The AV1 codec may then filter the edges using the determined filter strength values (16). In particular, the AV1 codec may perform MN1 cycles of edge filtering for M neighboring pixels, assuming N1 pixels are processed per cycle.

The AV1 codec may then determine whether to upsample the left and/or above neighboring boundaries (18). For example, the AV1 codec may evaluate upsampleAbove and upsampleLeft as shown in the pseudocode from the AV1 specification reproduced below. The AV1 codec may then perform upsampling of the left and/or above neighboring boundaries (20). In particular, the AV1 codec may perform M/N2 cycles of upsampling for 2×M neighbors, assuming N2 pixels are processed per cycle during the upsampling process. The AV1 codec may also retrieve dx and dy values from a look-up table, e.g., "Dr_Intra_derivative."

Using these calculated and retrieved values, the AV1 codec may then perform one of three types of prediction, based on the prediction angle. For example, the AV1 codec may evaluate the base value, index value, and shift value assuming the angle is less than 90 degrees (22). As another example, the AV1 codec may evaluate the base value, index value, and shift value assuming the angle is between 90 degrees and 180 degrees (24). As yet another example, the AV1 codec may evaluate the base value, index value, and shift value assuming the angle is greater than 180 degrees (26).

The AV1 codec may then determine base and base+1 values for pixels from the upsampled neighboring samples (28). The AV1 codec may further determine predicted samples from the selected samples and the shift values (30).

According to the AV1 Specification, Section 11.7.2.4, the algorithm corresponding to the method of FIG. 1 is as follows:

1a. If (plane=luma) pAngle=Base_Angle_Y+ ANGLE_STEP*AngleDelta_Y;
   Else pAngle=Base_Angle_UV+ ANGLE_STEP*AngleDelta_UV;
1b. If enable_intra-edge_filter=1, then:
   If pAngle not 90 or 180 degrees, then:
     If pAngle between 90 and 180 degrees, and (block_width+block_height>=24), Filter corner process is invoked where:
       New_top_left_pixel=Round2(5*topmost_ left_neighboring_pixel+current top_left neighboring pixel+5*leftmost_top_ neighboring_pixel, 4);
     If Top pixels available, then:
       Find top filter strength using Section 7.11.2.9 of AV1 Specification with Angle=abs(pAngle−90), blkWh=(block_width+block_height) and filterType as inputs.
       Set numPx=min(block_width, number of top neighbour pixels within the frame boundary)+ (pAngle<90? Block_height: 0).
       Do Multi-cycle Intra Edge filter process as given in Section 7.11.2.12 of AV1 Specification with top neighbor pixels, numPx and top filter strength as inputs.
     If Left pixels available, then:
       Find left filter strength using Section 7.11.2.9 of AV1 Specification with Angle=abs(pAngle−180), blkWh=(block_width+block_height) and filterType as inputs.
       Set numPx=min(block_height, number of left neighbour pixels within the frame boundary)+ (pAngle>180? Block_width: 0).
       Do Multi-cycle Intra Edge filter process as given in Section 7.11.2.1 of AV1 Specification with left neighbor pixels, numPx and left filter strength as inputs.
   For upsampling stage:
     In case of Top pixels:
       Evaluate upsampleAbove using Section 7.11.2.10 of AV1 Specification with Angle=abs(pAngle−90), blkWh=(block_width+block_height) and filterType as inputs.
       Set numPx=block_width+(pAngle<90? Block_height: 0).
       If upsampleAbove=1, do Multi-cycle upsampling as given in Section 7.11.2.11 of AV1 Specification with top neighbor pixels and numPx as inputs. The result will be upsampled top neighbor array of 2× the size the original neighbor array.
     In case of Left Pixels:
       Evaluate upsampleLeft using Section 7.11.2.10 with Angle=abs(pAngle−180), blkWh= (block_width+block_height) and filterType as inputs.
       Set numPx=block_height+(pAngle>180? Block_width: 0).
       If LeftUpseample_en=1, do Multi-cycle upsampling as given in Section 7.2.11.11 with left neighbor pixels and numPx as inputs. The result will be upsampled left neighbor array of 2× the size the original neighbor array.
1c. Have a look-up table "Dr_Intra_Derivative," which would store position scalars dx and dy. Evaluate dx and dy based on pAngle as given in Section 7.11.2.4 of the AV1 Specification.
1d. Assuming AboveRow=upsampled top neighbor array and LeftCol=upsampled left neighbor array. Now based on the prediction angles, there are three ways of performing prediction (if pAngle is 90 or 180, then top or left original neighbor pixels serve as the values of predicted pixels respectively):
   If pAngle<90 (i=column pos, j=row pos):
     idx=(i+1)*dx;
     maxBaseX=(w+h−1)<<upsampleAbove;
     base=min (maxBaseX, (idx>>(6−upsampleAbove))+(j<<upsampleAbove));
     shift=((idx<<upsampleAbove)>>1) & 0x1F; pred[i][j]=Clip(0, max_pixel_value, Round2(AboveRow[base]*(32−shift)+AboveRow[base+1]*shift, 5));
   If 90<pAngle<180 (i=column pos, j=row pos):
     idx=(j<<6)−(i+1)*dx;
     maxBaseX=(w+h−1)<<upsampleAbove;
     base=min (maxBaseX, (idx>>(6−upsampleAbove));
     If (base>−(1<<upSampleAbove))
       shift=((idx<<upsampleAbove)>>1) & 0x1F;
       pred[i][j]=Clip(0, max_pixel_value, Round2 (AboveRow[base] *(32−shift)+AboveRow [base+1] *shift, 5));
     Else
       idx=(i<<6)−(j+1)*dy;
       maxBaseY=(w+h−1)<<upsampleLeft;
       base=min (maxBaseY, (idx>>(6−upsampleLeft));
       shift=((idx<<upsampleLeft)>>1) & 0x1F;
       pred[i][j]=Clip(0, max_pixel_value, Round2 (LeftCol[base]*(32−shift)+LeftCol [base+1]*shift, 5));
   If pAngle>180 (i=column pos, j=row pos):
     idx=(j+1)*dy;
     maxBaseY=(w+h−1)<<upsampleAbove;
     base=min (maxBaseY, (idx>>(6−upsampleLeft))+ (i<<upsampleLeft));
     shift=((idx<<upsampleLeft)>>1) & 0x1F;
     pred[i][j]=Clip(0, max_pixel_value, Round2(LeftCol[base] *(32−shift)+LeftCol[base+1]*shift, 5));

Accordingly, the total number of process steps/cycles taken according to the techniques of the AV1 Specification as described above is 7+M/N1+M/N2, and the max storage size for storing the neighbor values is 2×M.

Figure 2:
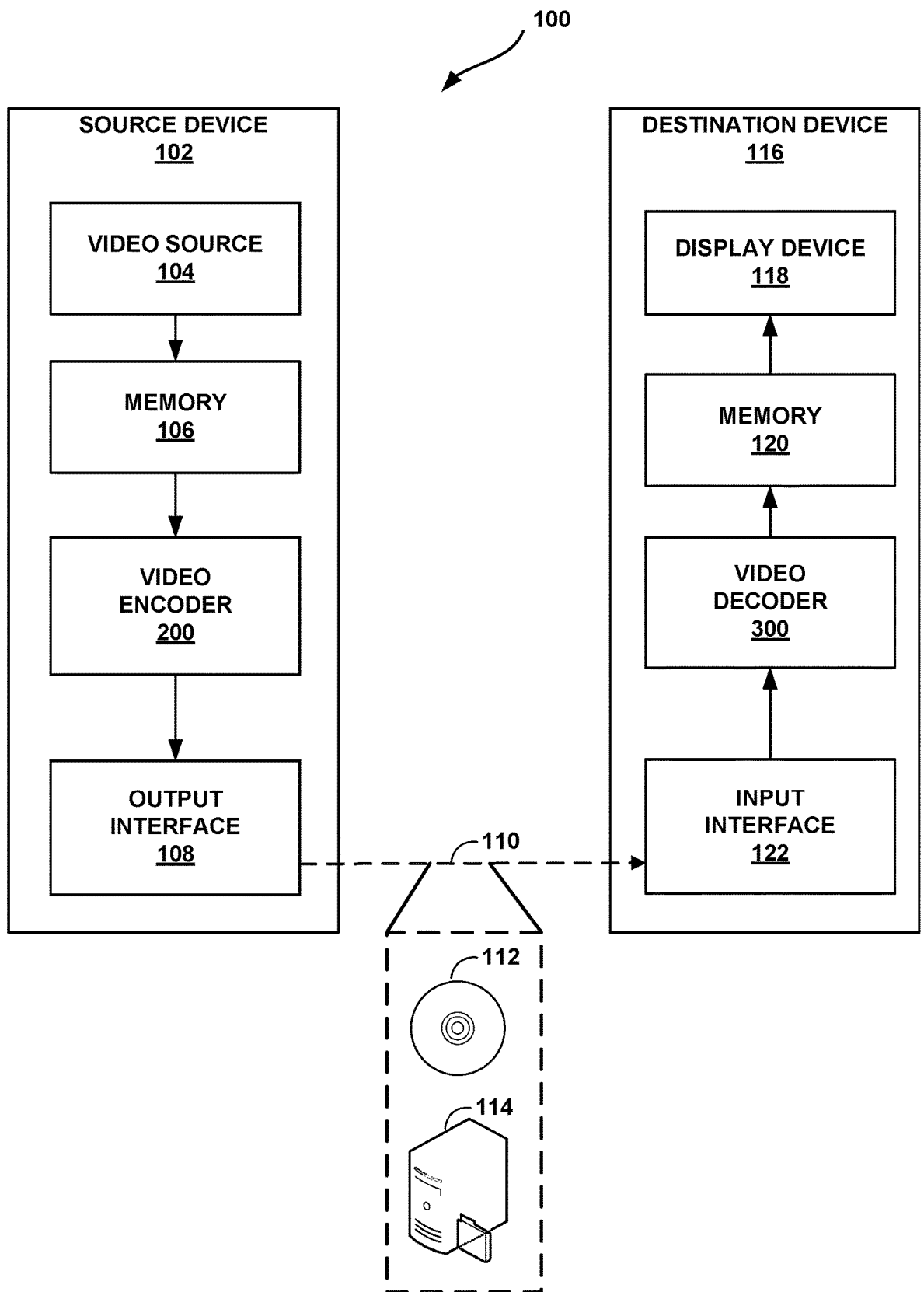
FIG. 2 is a block diagram illustrating an example video encoding and decoding system that may perform the techniques of this disclosure.

FIG. 2 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 2, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 2, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for calculating predicted values according to directional intra-prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 2 is merely one example. In general, any digital video encoding and/or decoding device may perform techniques for calculating predicted values according to directional intra-prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 2, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

In some examples of the disclosure, video encoder 200 and video decoder 300 may operate according to a video coding format, such as AOMedia Video 1 (AV1) or extensions thereto, as well as successor coding formats (e.g., AV2) that may currently be in development or will be forthcoming. In other examples, video encoder 200 and video decoder 300 may operate according to other proprietary or industry standards. The techniques of this disclosure, however, are not limited to any particular coding standard and/or video coding format. In general, video encoder 200 and video decoder 300 may be configured to perform the techniques of this disclosure in conjunction with any video coding techniques that calculate predicted values according to directional intra-prediction.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

This disclosure may use "N×N" and "N by N" interchangeably to refer to the sample dimensions of a block (such as a coding block, superblock, or other block of video data) in terms of vertical and horizontal dimensions, e.g., 16×16 samples or 16 by 16 samples. In general, a 16×16 coding block will have 16 samples in a vertical direction (y=16) and 16 samples in a horizontal direction (x=16). Likewise, an N×N coding block generally has N samples in a vertical direction and N samples in a horizontal direction, where N represents a nonnegative integer value. The samples in a coding block may be arranged in rows and columns. Moreover, coding blocks need not necessarily have the same number of samples in the horizontal direction as in the vertical direction (i.e., the coding block may be non-square). For example, coding blocks may comprise N×M samples, where M is not necessarily equal to N.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of the block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding enables parallel processing and multi-threading for encoder and decoder implementations.

In some examples, a coding block includes a coding bock of luma samples and two coding blocks of corresponding chroma samples for a picture that has three sample arrays. In other examples, a coding block comprises a single coding block of luma samples (e.g., for a monochrome picture). AV1 supports 4:0:0 chroma subsampling (e.g., monochrome), 4:2:0 chroma subsampling, 4:2:2 chroma subsampling, and 4:4:4 chroma subsampling (i.e., no chroma subsampling). AV1 may code video data in a YUV color space where Y is a luma component, U is a first chroma component (e.g., blue projection), and V is a second chroma component (e.g., red projection).

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

The difference between the currently encoded samples and predicted values generated from the reference samples is called a residual. Video encoder 200 may encode the residual values (e.g., through transformation, quantization, and entropy coding) in an encoded video bitstream. Video decoder 300 may decode the residual values, determine predicted values generated from the reference samples in the same manner as video encoder 200, and add the predicted values generated from reference samples to the residuals to reconstruct the coding block The intra prediction modes of AV1 include directional intra prediction (also referred to as angular intra prediction), non-directional smooth intra prediction, recursive filter intra prediction, chroma from luma (CFL) prediction, intra block copy, and color palette modes. Video encoder 200 may encode syntax elements that indicate the intra prediction mode used to video decoder 300.

Video encoder 200 may generally form a prediction block for the coding block using one of the aforementioned inter prediction modes or intra prediction modes (e.g., excluding color palette mode). In general, video encoder 200 subtracts the value of the sample of the coding block from a prediction sample determined according to one of the intra prediction modes or inter prediction modes to determine a residual block. Video decoder 300 performs the inverse of this operation. Video decoder 300 determines the prediction samples in the same manner as video encoder 200, but adds the decoded residual to the prediction sample to reconstruct the coding block.

To encode a block using directional (i.e., angular) intra prediction, video encoder 200 may determine particular directional intra prediction mode to determine the prediction samples. AV1 provides fifty-six directional intra prediction modes. When encoding a coding block using directional intra prediction, video encoder 200 uses a directional predictor that projects each sample of the coding block to a prediction sample location. The prediction sample location may be a sub-pixel location (e.g., between samples). In such a case, video encoder may use interpolation (e.g., a 2-tap bilinear filter) to determine the value of the prediction sample.

The AV1 specification provides for directional intra-prediction using upsampled neighboring pixels, as discussed above. However, upsampling all neighboring pixels in AV1 can require a large amount of memory to store the upsampled neighboring pixels. Upsampling in this manner also requires many computational cycles. Furthermore, in some directional intra-prediction modes, many of the upsampled values will not actually be used when intra-predicting the current block. Accordingly, video encoder 200 and video decoder 300 may be configured to generate a prediction block using a directional intra-prediction mode (i.e., an angular intra prediction mode) for which formulas are defined that both upsample the particular neighboring pixels used for the selected directional intra-prediction mode and that actually calculate predicted values for the prediction block from those neighboring pixels. In this manner, less memory is needed to store the upsampled neighboring pixel values, and fewer calculations can be performed when both upsampling the neighboring pixels and calculating the prediction block. Specific details regarding these techniques are explained in greater detail below.

In non-directional smooth intra prediction, video encoder 200 may determine prediction samples according a DC prediction mode, a Paeth prediction mode, or by using one of three smooth predictors. In DC prediction mode, video encoder 200 predicts samples of a block from the average of available neighboring reference samples. In Paeth prediction mode, video encoder 200 uses one of a top reference sample, left reference sample, or top-left edge reference sample which has a value closest to (top+left−topleft). Video encoder 200 may determine the three smooth predictors using quadratic interpolation in a horizontal direction, a vertical direction, or the average of the interpolations in the horizontal and vertical directions.

Video encoder 200 may determine to use recursive filter intra prediction in situations where there is reduced spatial correlation between samples of the coding blocks and prediction samples at the edges of coding blocks. To perform recursive intra prediction, video encoder 200 may determine one of five filter intra modes. Each of the five intra modes are defined by a set of 7-tap filters that specify a correlation between samples in a 4×2 sub-block and seven adjacent neighboring samples. Video encoder 200 may determine one of five types of intra filter modes at the block level and predict samples in 4×2 sub-blocks.

Video encoder 200 may determine to use chroma from luma (CFL) to predict chroma samples from corresponding reconstructed luma samples. In particular, video encoder 200 may use sums of reconstructed luma samples in 2×2 sub-blocks of a luma block minus the average luma sample value of the block, as well as DC prediction samples for the chroma block, to determine a final prediction sample for predicting the chroma samples. The sums of reconstructed luma samples in 2×2 sub-blocks of a luma block minus the average luma sample value of the block represent an "AC" contribution from the luma block.

In intra block copy mode, video encoder 200 and video decoder 300 may predict a coding block using a previously-reconstructed coding block as a reference block, where the reference block is in the same frame as the currently coded coding block. Video encoder 200 may indicate a location of the previously-reconstructed coding block using a displacement vector (e.g., an x and y displacement from the currently coded coding block). Intra block copy mode is similar to a translational inter prediction mode, but rather than using a reference block in another frame, the intra block copy mode uses a reference block from the same frame. Intra block copy mode may be particularly useful for so-called "screen content" video frames that may include text, characters, and/or repeated textures (e.g., such as video displaying the contents of a computer screen).

In each of the aforementioned intra prediction modes, video encoder 200 may generate a residual block by subtracting the sample values of a currently coded block from prediction pixels generated in accordance with one of the intra prediction modes. Color palette mode is considered another type of intra prediction mode, as color palette mode does not use predicted samples generated from reference samples values. However, video encoder 200 and video decoder 300 do not encode and decode, respectively, residual values in color palette mode. Instead, video encoder 200 may associate code information that indicates an index to a color palette for each sample/pixel of the coding block. The color palette is a table of color values. Color palette mode may be useful for frames of video data with an limited number of unique colors (e.g., screen content).

When predicting blocks of a current frame of video data using an inter prediction mode, video encoder 200 and video decoder 300 may use video data from one or more reference frames of video data. Video encoder 200 may encode sample values based on the differences (e.g., the residuals) between sample values of a current block to be coded and prediction samples within a different frame (e.g., a reference frame). The reference frame may be before or after the currently coded frame in presentation order. Video encoder 200 may determine the prediction samples and reference frame based on the inter prediction mode.

Like for intra prediction modes (excepting color palette mode), video encoder 200 may encode the residual values (e.g., through transformation, quantization, and entropy coding) in an encoded video bitstream. Video decoder 300 may decode the residual values, determine the prediction block in the same manner as video encoder 200, and add the prediction block to the residuals to reconstruct the coding block. Video encoder 200 may determine a particular inter prediction mode from among a plurality of inter prediction modes that provides the best rate-distortion cost. Video encoder 200 may encode the mode information, residual values (e.g., the difference between a current sample and a prediction sample), and other block characteristics in an encoded video bitstream. The inter prediction modes of AV1 include translational motion compensation, affine motion compensation (e.g., warped motion compensation), overlapped block motion compensation (OBMC), and compound inter-intra predictor modes.

For translational motion compensation, video encoder 200 may generate the prediction block (e.g., the block including the prediction samples) using one or more motion vectors. Video encoder 200 may generally perform a motion search to identify a reference block that closely matches the coding block, e.g., in terms of differences between the samples of the coding block and the prediction samples of the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current coding block using uni-directional prediction or bi-directional prediction.

Video encoder 200 may also encode the motion vector(s) using a prediction method. For example, video encoder 200 may encode motion vectors with reference to other candidate motion vectors, including spatial motion vectors (e.g., motion vectors of neighboring blocks encoded using inter prediction) or temporal motion vectors (e.g., motion vectors from co-located blocks in other pictures coded using inter prediction). The candidate motion vectors may be added to a dynamic motion vector reference list.

AV1 also provides an affine motion compensation mode. In affine motion compensation mode, video encoder 200 may determine the warping parameters to warp the reference block to get the prediction using neighboring candidates' motion vectors. The warping parameters represent non-translational or affine motion, such as zoom in or out, rotation, perspective motion, or other irregular motion types.

Video encoder 200 may use OBMC mode to decrease prediction errors near block edges. In OBMC mode, video encoder 200 and video decoder 300 determine prediction samples using prediction samples generated based on motion vectors from the top neighboring block and/or the left neighboring block. Video encoder 200 and video decoder 300 may generate the final prediction samples by combining such prediction samples using smoothing filters.

In compound inter-intra predictor mode, video encoder 200 and video decoder 300 may form a prediction sample using both inter prediction and intra prediction techniques. Two prediction samples may be combined using weighting coefficients.

When performing a prediction process, such as intra prediction or inter prediction of a block, video encoder 200 may calculate residual data for the block. The residual data, such as a residual block, represents sample by sample differences between the block and prediction samples for the block, formed using the corresponding prediction mode. Video encoder 200 may apply one or more transforms to the residual block, to produce transformed data in a transform domain instead of the sample domain. For example, video encoder 200 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may entropy encode syntax elements, including syntax element indicating the value of quantized transform coefficients. As another example, video encoder 200 may entropy encode prediction syntax elements (e.g., motion information for inter prediction or intra mode information for intra prediction). In accordance with AV1, video encoder 200 may be configured to perform entropy encoding using a symbol-to-symbol adaptive multi-symbol arithmetic coder. A syntax element in AV1 includes an alphabet of N elements, and a context (e.g., probability model) includes a set of N probabilities. Video encoder 200 may store the probabilities as 15 bit cumulative distribution functions (CDFs). Video encoder 200 may perform recursive scaling, with an update factor based on the alphabet size, to update the contexts.

In this manner, video encoder 200 may generate a bitstream including encoded video data, e.g., syntax elements describing partitioning of a picture into blocks (e.g., superblocks and coding blocks) and prediction modes and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using entropy decoding in a manner substantially similar to, albeit reciprocal to, the entropy encoding process of video encoder 200. The syntax elements may define partitioning information for partitioning of a picture into superblocks and coding blocks. The syntax elements may further define prediction and residual information for blocks (e.g., coding blocks) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (e.g., an intra or inter prediction mode) and related prediction information (e.g., motion information for inter prediction) to form a prediction samples for the block. Video decoder 300 may then combine the prediction samples and the corresponding sample values of the residual block (on a sample-by-sample basis) to reproduce the original block. Video decoder 300 may perform additional processing, such as performing a loop filtering process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 3:
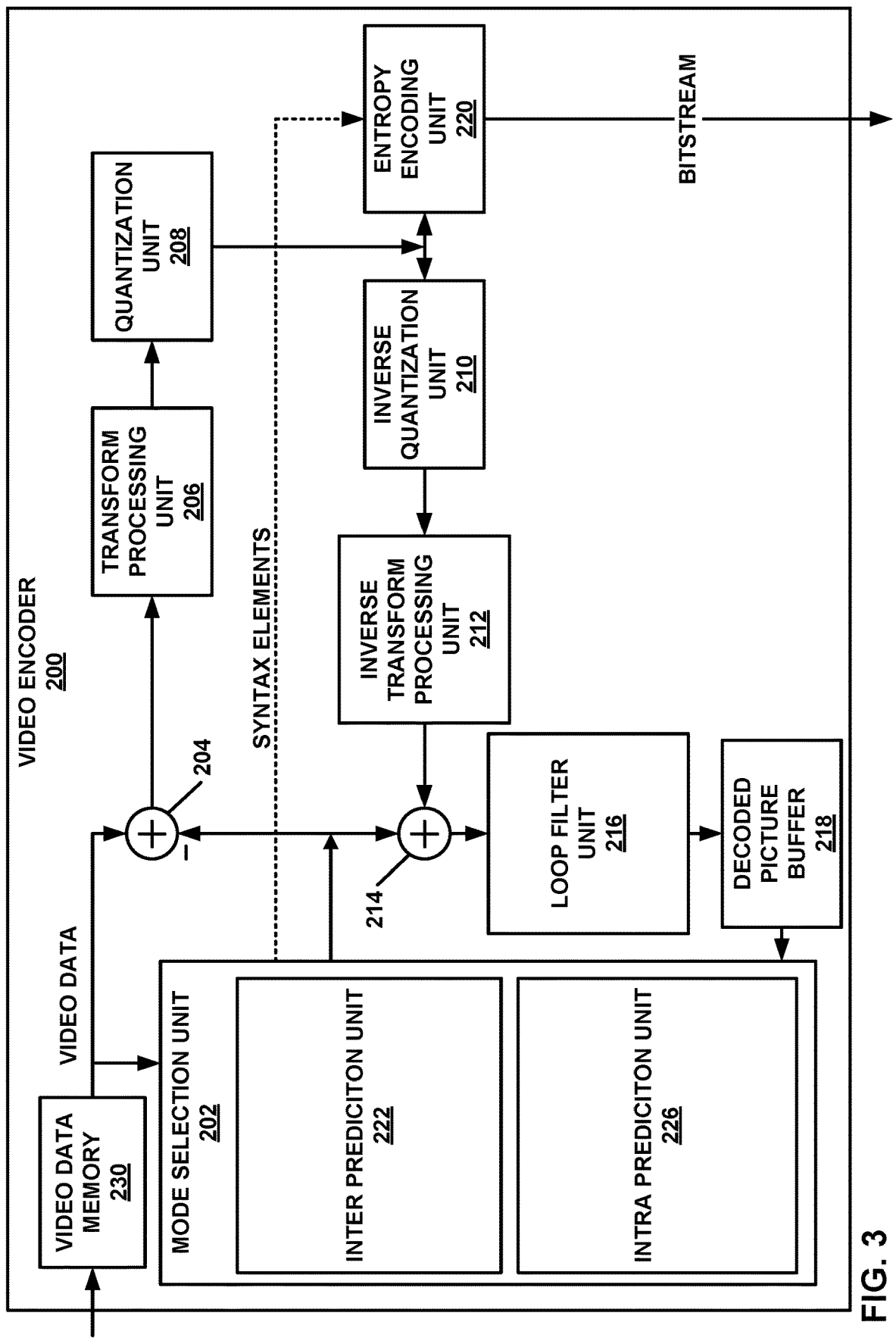
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of the AV1 coding format. However, the techniques of this disclosure may be performed by video encoding devices that are configured to encode video data according to other video coding formats and/or various video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, loop filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, loop filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 2). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 2 may also provide temporary storage of outputs from the various units of video encoder 200. For example, as will be explained below, video data memory 230 may include a first buffer and a second buffer for storing the sums and averages of reconstructed luma sample values for CFL prediction.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 2) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture/frame of the video data from video data memory 230 and provide the video data to residual generation unit 204 and mode selection unit 202. Video data in video data memory 230 may be raw video data that is to be encoded.

Mode selection unit 202 includes inter prediction unit 222 and intra prediction unit 226. Inter prediction unit 222 may be configured to predict coding blocks of video data (e.g., both luma and chroma coding blocks) using translational motion compensation, affine motion compensation, OBMC, and/or compound inter-intra prediction, as described above. Intra prediction unit 226 may be configured to predict coding blocks of video data (e.g., both luma and chroma coding blocks) using directional intra prediction, non-directional intra prediction, recursive filter intra prediction, CFL, intra block copy (IBC), and/or color palette mode, as described above. Mode selection unit 202 may include additional functional units to perform video prediction in accordance with other prediction modes.

Mode selection unit 202 generally coordinates multiple encoding passes to test combinations of encoding parameters and resulting rate-distortion values for such combinations. The encoding parameters may include partitioning of superblocks into coding blocks, prediction modes for the coding blocks, transform types for residual data of the coding blocks, quantization parameters for residual data of the coding blocks, and so on. Mode selection unit 202 may ultimately select the combination of encoding parameters having rate-distortion values that are better than the other tested combinations.

Video encoder 200 may partition a picture retrieved from video data memory 230 into a series of coding blocks, and encapsulate one or more superblocks within a tile. Mode selection unit 202 may partition superblocks of the picture in accordance with a tree structure.

In general, mode selection unit 202 also controls the components thereof (e.g., inter prediction unit 222 and intra prediction unit 226) to generate prediction samples for a current coding block. For example, for translational inter prediction of a current block, inter prediction unit 222 may perform a motion search to identify one or more closely matching reference blocks in one or more reference pictures (e.g., one or more previously coded pictures stored in DPB 218).

In particular, inter prediction unit 222 may calculate a value representative of how similar a potential reference block is to the current block, e.g., according to sum of absolute difference (SAD), sum of squared differences (SSD), mean absolute difference (MAD), mean squared differences (MSD), or the like. Inter prediction unit 222 may generally perform these calculations using sample-by-sample differences between the current block and the reference block being considered. Inter prediction unit 222 may identify a reference block having a lowest value resulting from these calculations, indicating a reference block that most closely matches the current block.

For translational inter prediction, inter prediction unit 222 may form one or more motion vectors (MVs) that defines the positions of the reference blocks in the reference pictures relative to the position of the current block in a current picture. For example, for uni-directional inter prediction, inter prediction unit 222 may determine a single motion vector, whereas for bi-directional inter prediction, inter prediction unit 222 may determine two motion vectors.

Inter prediction unit 222 may then generate a prediction block of prediction samples using the motion vectors. For example, inter prediction unit 222 may retrieve data of the reference block using the motion vector. As another example, if the motion vector has fractional sample precision, inter prediction unit 222 may interpolate values for the prediction block according to one or more interpolation filters. Moreover, for bi-directional inter prediction, inter prediction unit 222 may retrieve data for two reference blocks identified by respective motion vectors and combine the retrieved data, e.g., through sample-by-sample averaging or weighted averaging.

As another example, for intra prediction, intra prediction unit 226 may generate the prediction samples from samples in the same picture as the current block. In some examples, intra prediction unit 226 may generate prediction samples from reference samples that neighbor the current block. For example, for directional intra prediction modes, intra prediction unit 226 may generally mathematically combine values of neighboring samples and use these calculated values in the defined direction across the current block as the prediction block. As another example, for the non-directional DC mode, intra prediction unit 226 may calculate an average of the neighboring samples to the current block to generate the prediction samples.

When using a directional intra-prediction mode (i.e., an angular intra prediction mode), intra prediction unit 226 may apply the techniques of this disclosure to upsample neighboring reference pixels and generate the prediction block. In particular, intra prediction unit 226 may execute formulas that jointly upsample only the necessary neighboring reference pixels and that generate prediction pixels from the upsampled neighboring reference pixels.

In particular, mode selection unit 202 may cause intra prediction unit 226 to test or use a directional (angular) intra prediction mode for a current block of video data. According to the techniques of this disclosure, intra prediction unit 226 may use an angle of a prediction direction associated with the directional intra prediction mode to determine neighboring samples to the current block that will be used to generate a prediction block for the current block and that are to be upsampled. Intra prediction unit 226 may select formulas associated with the directional intra prediction mode that jointly upsample the neighboring reference pixels and that generate the prediction samples of the prediction block upon execution of the formulas. In this manner, intra prediction unit 226 may avoid upsampling neighboring samples to the current block that will not be used as reference samples for generating prediction samples of the prediction block.

For other video coding techniques such as an intra block copy mode, affine motion compensation, recursive filter intra prediction, and other prediction modes, as some examples, inter prediction unit 222 or intra prediction unit 226 generates prediction samples in accordance with the techniques of the particular coding mode being used. In some examples, such as color palette mode coding, intra prediction unit 226 may not generate prediction samples, and instead generates syntax elements that indicate the manner in which to reconstruct the block based on a selected color palette. In such modes, mode selection unit 202 may provide these syntax elements to entropy encoding unit 220 to be encoded.

Mode selection unit 202 provides the prediction samples to residual generation unit 204. Residual generation unit 204 receives a raw, unencoded version of the current block from video data memory 230 and the prediction samples from mode selection unit 202. Residual generation unit 204 calculates sample-by-sample differences between the current block and the prediction samples. The resulting sample-by-sample differences define a residual block for the current block. In some examples, residual generation unit 204 may be formed using one or more subtractor circuits that perform binary subtraction.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current coding block. Video encoder 200 (e.g., via mode selection unit 202) may adjust the degree of quantization applied to the transform coefficient blocks associated with the current block by adjusting the QP value associated with the coding block. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current coding block (albeit potentially with some degree of distortion) based on the reconstructed residual block and the prediction samples generated by mode selection unit 202. For example, reconstruction unit 214 may add samples of the reconstructed residual block to corresponding prediction samples generated by mode selection unit 202 to produce the reconstructed block.

Loop filter unit 216 may perform one or more filter operations on reconstructed blocks. For example, loop filter unit 216 may perform deblocking operations to reduce blockiness artifacts along edges of CUs. In other examples, loop filter unit 216 may apply a constrained directional enhancement filter (CDEF), which may be applied after deblocking, and may include the application of non-separable non-linear low-pass directional filters based on estimated edge directions. Loop filter unit 216 may also include a loop restoration filter, which is applied after CDEF, and may include a separable symmetric normalized Wiener filter or a dual self-guided filter. Operations of loop filter unit 216 may be skipped, in some examples.

Video encoder 200 stores reconstructed blocks in DPB 218. For instance, in examples where operations of loop filter unit 216 are not performed, reconstruction unit 214 may store reconstructed blocks to DPB 218. In examples where operations of loop filter unit 216 are performed, loop filter unit 216 may store the filtered reconstructed blocks to DPB 218. Inter prediction unit 222 may retrieve a reference picture from DPB 218, formed from the reconstructed (and potentially filtered) blocks, to inter predict blocks of subsequently encoded pictures. In addition, intra prediction unit 226 may use reconstructed blocks in DPB 218 of a current picture to intra predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter prediction or intra mode information for intra prediction) from mode selection unit 202.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as 15 bit cumulative distribution functions (CDFs). Entropy encoding unit 220 may perform recursive scaling, with an update factor based on the alphabet size, to update the contexts.

Video encoder 200 may output an encoded video bitstream that includes the entropy encoded syntax elements needed to reconstruct blocks of a slice or picture. For example, entropy encoding unit 220 may output the bitstream.

Video encoder 200 represents an example of a device configured to encode and decode video data including a memory configured to store video data, and one or more processing units implemented in circuitry and configured to determine that a current block of the video data is to be predicted using an angular intra-prediction mode; determine neighboring samples to the current block that will be used to generate a prediction block for the current block according to an angle of the angular intra-prediction mode and that are to be upsampled; calculate predicted samples of the prediction block according to formulas that jointly upsample the neighboring samples that will be used to generate the prediction block and that generate the values for the predicted samples; and encode and decode the current block using the prediction block.

Figure 4:
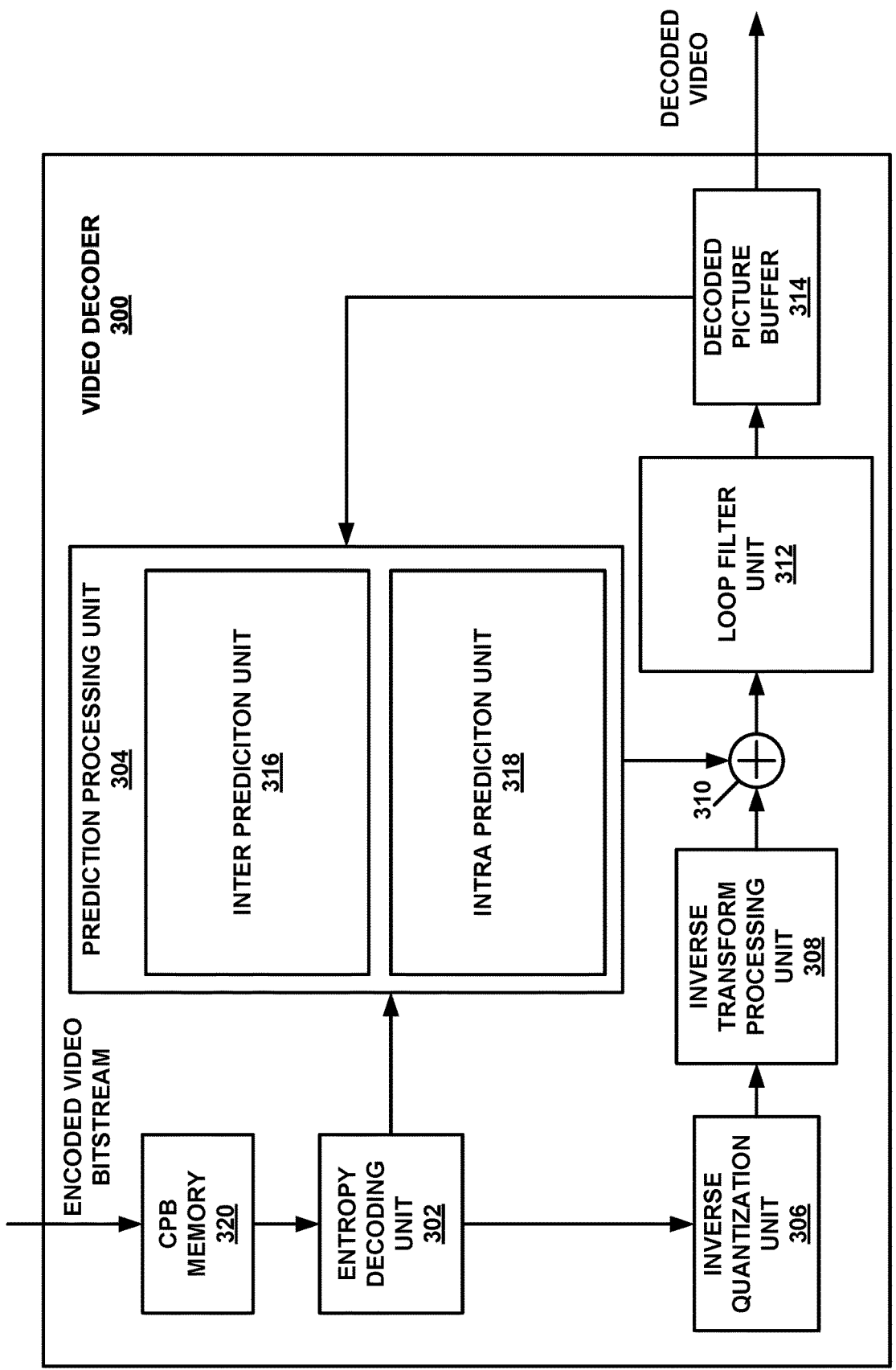
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of the AV1 video coding format. However, the techniques of this disclosure may be performed by video decoding devices that are configured to decode video data according to other video coding formats and/or various other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, loop filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, loop filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes inter prediction unit 316 and intra prediction unit 318. Inter prediction unit 316 may be configured to predict coding blocks of video data (e.g., both luma and chroma coding blocks) using translational motion compensation, affine motion compensation, OBMC, and/or compound inter-intra prediction, as described above. Intra prediction unit 318 may be configured to predict coding blocks of video data (e.g., both luma and chroma coding blocks) using directional intra prediction, non-directional intra prediction, recursive filter intra prediction, CFL, intra block copy (IBC), and/or color palette mode, as described above. Prediction processing unit 304 may include additional functional units to perform video prediction in accordance with other prediction modes.

CPB memory 320 may store video data, such as an encoded video bitstream, to be decoded by the components of video decoder 300. The video data stored in CPB memory 320 may be obtained, for example, from computer-readable medium 110 (FIG. 2). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. For example, as will be explained below, CPB memory 320 may include a first buffer and a second buffer for storing the sums and averages of reconstructed luma sample values for CFL prediction.

DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 2). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from CPB memory 320 and entropy decodes the video data to reproduce syntax elements. Prediction processing unit 304, inverse quantization unit 306, inverse transform processing unit 308, reconstruction unit 310, and loop filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current coding block. For example, inverse transform processing unit 308 may apply a horizontal/vertical combination of an inverse DCT, inverse ADST, inverse flipped ADST, or an inverse identity transform.

Furthermore, prediction processing unit 304 generates prediction samples according to prediction information syntax elements that were entropy decoded by entropy decoding unit 302. For example, if the prediction information syntax elements indicate that the current block is inter predicted, inter prediction unit 316 may generate the prediction samples. In this case, the prediction information syntax elements may indicate a reference picture in DPB 314 from which to retrieve a reference block, as well as a motion vector identifying a location of the reference block in the reference picture relative to the location of the current block in the current picture. Inter prediction unit 316 may generally perform the inter prediction process in a manner that is substantially similar to that described with respect to inter prediction unit 222 (FIG. 3).

As another example, if the prediction information syntax elements indicate that the current block is intra predicted, intra prediction unit 318 may generate the prediction samples according to an intra prediction mode indicated by the prediction information syntax elements. Again, intra prediction unit 318 may generally perform the intra prediction process in a manner that is substantially similar to that described with respect to intra prediction unit 226 (FIG. 3). Intra prediction unit 318 may retrieve data of neighboring samples to the current block from DPB 314.

When using a directional intra-prediction mode (i.e., an angular intra prediction mode), intra prediction unit 318 may apply the techniques of this disclosure to upsample neighboring reference pixels and generate the prediction block. In particular, intra prediction unit 318 may execute formulas that jointly upsample only the necessary neighboring reference pixels and that generate prediction pixels from the upsampled neighboring reference pixels.

In particular, prediction processing unit 304 may cause intra prediction unit 318 to use a directional (angular) intra prediction mode for a current block of video data, e.g., in response to receiving data from entropy decoding unit 302 indicative of the directional intra prediction mode. According to the techniques of this disclosure, intra prediction unit 318 may use an angle of a prediction direction associated with the directional intra prediction mode to determine neighboring samples to the current block that will be used to generate a prediction block for the current block and that are to be upsampled. Intra prediction unit 318 may select formulas associated with the directional intra prediction mode that jointly upsample the neighboring reference pixels and that generate the prediction samples of the prediction block upon execution of the formulas. In this manner, intra prediction unit 318 may avoid upsampling neighboring samples to the current block that will not be used as reference samples for generating prediction samples of the prediction block.

Reconstruction unit 310 may reconstruct the current block using the prediction block and the residual block. For example, reconstruction unit 310 may add samples of the residual block to corresponding prediction samples to reconstruct the current block.

Loop filter unit 312 may perform one or more filter operations on reconstructed blocks. For example, loop filter unit 312 may perform deblocking operations to reduce blockiness artifacts along edges of the reconstructed blocks. In other examples, loop filter unit 312 may apply a constrained directional enhancement filter (CDEF), which may be applied after deblocking. and may include the application of non-separable non-linear low-pass directional filters based on estimated edge directions. Loop filter unit 312 may also include a loop restoration filter, which is applied after CDEF, and may include a separable symmetric normalized Wiener filter or a dual self-guided filter. Operations of loop filter unit 312 are not necessarily performed in all examples.

Video decoder 300 may store the reconstructed blocks in DPB 314. For instance, in examples where operations of loop filter unit 312 are not performed, reconstruction unit 310 may store reconstructed blocks to DPB 314. In examples where operations of loop filter unit 312 are performed, loop filter unit 312 may store the filtered reconstructed blocks to DPB 314. As discussed above, DPB 314 may provide reference information, such as samples of a current picture for intra prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 2.

In this manner, video decoder 300 represents an example of a video decoding device including a memory configured to store video data, and one or more processing units implemented in circuitry and configured to determine that a current block of the video data is to be predicted using an angular intra-prediction mode; determine neighboring samples to the current block that will be used to generate a prediction block for the current block according to an angle of the angular intra-prediction mode and that are to be upsampled; calculate predicted samples of the prediction block according to formulas that jointly upsample the neighboring samples that will be used to generate the prediction block and that generate the values for the predicted samples; and decode the current block using the prediction block.

Figure 5:
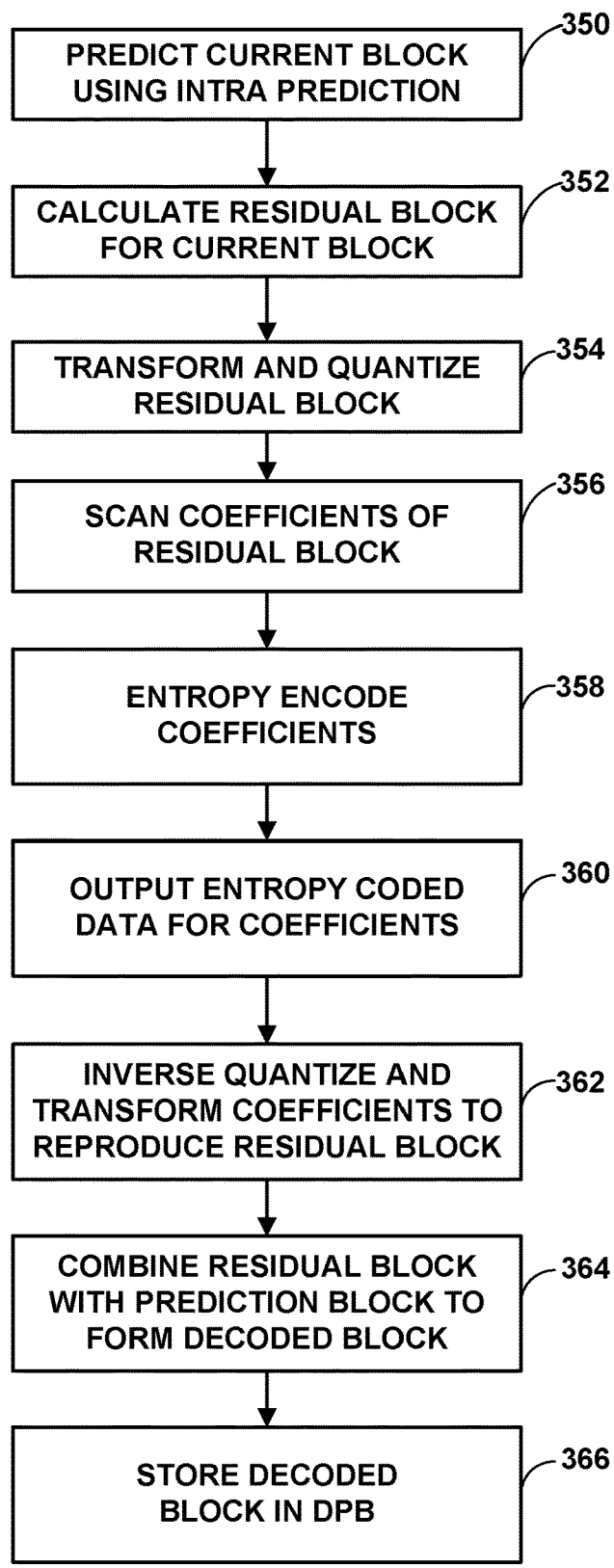
FIG. 5 is a flowchart illustrating an example method for encoding a current block in accordance with the techniques of this disclosure.

FIG. 5 is a flowchart illustrating an example method for encoding a current block in accordance with the techniques of this disclosure. The current block may comprise a current CU. Although described with respect to video encoder 200 (FIGS. 1 and 2), it should be understood that other devices may be configured to perform a method similar to that of FIG. 5.

In this example, video encoder 200 initially predicts the current block (350). For example, video encoder 200 may form a prediction block for the current block. Video encoder 200 may form the prediction block using a directional (angular) intra prediction mode according to the techniques of this disclosure. For example, video encoder 200 may determine an angle of the directional intra prediction mode. Video encoder 200 may use the determined angle to select and execute formulas that jointly upsample only the necessary neighboring reference pixels and that generate prediction pixels from the upsampled neighboring reference pixels to form the prediction block.

Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

Figure 6:
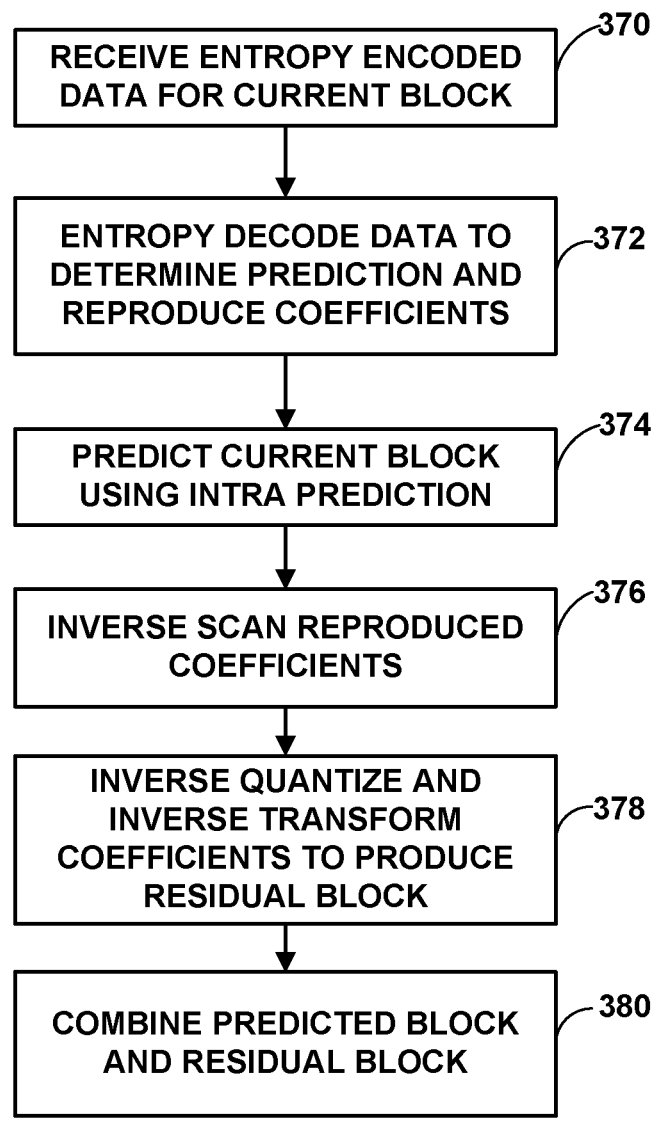
FIG. 6 is a flowchart illustrating an example method for decoding a current block in accordance with the techniques of this disclosure.

In this manner, the method of FIG. 6 represents an example of a method of encoding and decoding video data including determining that a current block of video data is to be predicted using an angular intra-prediction mode; determining neighboring samples to the current block that will be used to generate a prediction block for the current block according to an angle of the angular intra-prediction mode and that are to be upsampled; calculating predicted samples of the prediction block according to formulas that jointly upsample the neighboring samples that will be used to generate the prediction block and that generate the values for the predicted samples; and encoding and decoding the current block using the prediction block.

FIG. 6 is a flowchart illustrating an example method for decoding a current block in accordance with the techniques of this disclosure. The current block may comprise a current CU. Although described with respect to video decoder 300 (FIGS. 1 and 3), it should be understood that other devices may be configured to perform a method similar to that of FIG. 6.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using a directional intra-prediction mode as indicated by the prediction information for the current block, to calculate a prediction block for the current block. For example, video decoder 300 may determine an angle of the directional intra prediction mode. Video decoder 300 may use the determined angle to select and execute formulas that jointly upsample only the necessary neighboring reference pixels and that generate prediction pixels from the upsampled neighboring reference pixels to form the prediction block.

Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

In this manner, the method of FIG. 6 represents an example of a method of decoding video data including determining that a current block of video data is to be predicted using an angular intra-prediction mode; determining neighboring samples to the current block that will be used to generate a prediction block for the current block according to an angle of the angular intra-prediction mode and that are to be upsampled; calculating predicted samples of the prediction block according to formulas that jointly upsample the neighboring samples that will be used to generate the prediction block and that generate the values for the predicted samples; and decoding the current block using the prediction block.

Figure 7:
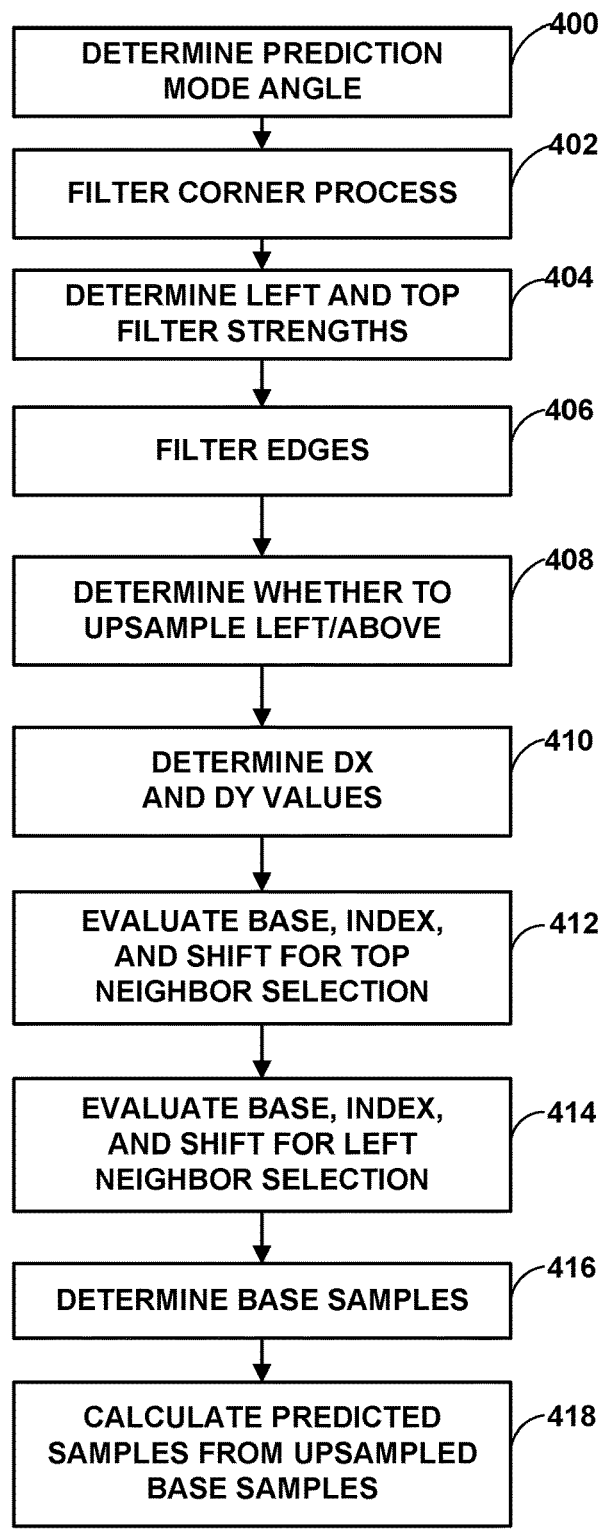
FIG. 7 is a flowchart illustrating an example technique for performing intra-prediction according to the techniques of this disclosure.

FIG. 7 is a flowchart illustrating an example technique for performing intra-prediction according to the techniques of this disclosure. The method of FIG. 7 may be performed by video encoder 200 and/or video decoder 300 or other such coding devices. Video encoder 200 may perform the method of FIG. 7 as part of step 350 of the method of FIG. 5. Video decoder 300 may perform the method of FIG. 7 as part of step 374 of the method of FIG. 6. For purposes of explanation, the method of FIG. 7 is explained with respect to video decoder 300.

Initially, video decoder 300 may determine a prediction mode angle (400). For example, video decoder 300 may determine that a current block of video data is to be predicted using a directional (angular) intra prediction mode. Thus, video decoder 300 may determine an angle associated with the directional intra prediction mode. Video decoder 300 may perform a filter corner process (402) to filter an upper-left corner neighboring pixel to the current block. For example, video decoder 300 may perform the following to calculate a filtered value of the upper-left corner neighboring pixel (new_top_left_pixel): new_top_left_pixel=Round2(5*topmost_left_neighboring_pixel+current_top_left neighboring pixel+ 5*leftmost_top_neighboring_pixel, 4), where topmost_left_neighboring_pixel represents a value for a pixel directly below the upper-left corner neighboring pixel, leftmost_top_neighboring_pixel represents a value for a pixel directly to the right of the upper-left corner neighboring pixel, and current_top_left neighboring_pixel represents a value for the current upper-left neighboring pixel.

Video decoder 300 may then determine left and top filter strength values (404). For example, video decoder 300 may perform the techniques of the AV1 Specification at Section 7.11.2.9 to calculate the left and top filter strength values. Video decoder 300 may further filter the edges (406), i.e., the left and above neighboring samples. For example, video decoder 300 may perform the techniques of the AV1 Specification at Section 7.11.2.12 to filter the edges. Video decoder 300 may perform M/N1 cycles of edge filtering for M neighboring pixels, assuming N1 pixels are processed per cycle.

Video decoder 300 may then determine whether the above and/or left neighboring pixels are to be upsampled (408). For example, video decoder 300 may determine values for upsampleAbove and upsampleLeft according to the AV1 Specification at Section 7.11.2.10. Video decoder 300 may also determine dx and dy values (410), e.g., from a look-up table, such as "Dr Intra derivatives" using the intra-prediction angle as input to the look-up table, as specified in the AV1 Specification in Sections 7.11.2.4 and 9.3. At this point, all necessary inputs for performing intra prediction using the determined directional intra prediction mode are available, and thus, video decoder 300 may begin calculating values for the prediction samples of the prediction block.

Video decoder 300 may perform a left neighbor prediction path calculation and a top neighbor prediction path calculation in sequence or in parallel. In general, to perform the top neighbor prediction path calculation, video decoder 300 may evaluate a base value, an index value, and a shift value for the top neighbor selection (412). In sequence or in parallel, video decoder 300 may also perform the left neighbor prediction path calculation, including evaluating a base value, an index value, and a shift value for the left neighbor selection (414). Example details for calculating the base value, the index value, and the shift value are described in greater detail below.

Video decoder 300 may then determine whether, for a current prediction pixel of the prediction block, the top neighbor or the left neighbor is selected, and determine four base pixels (p1, p2, p3, and p4) from the top neighboring or left neighboring pixels according to the determination and using the corresponding calculated base value (416). For example, video decoder 300 may determine p1 as (base/2−1), p2 as (base/2), p3 as (base/2+1), and p4 as (base/2+2), where base represents the base value discussed above that indicates a base starting position relative to the position of the current prediction pixel in either the top or left neighboring pixels. Video decoder 300 may also calculate a value for the current prediction pixel from the four base pixels and the corresponding calculated shift value (418), e.g., using 9*(p1+p4)−(p2+p3) to calculate upsampled reference pixel values. For example, video decoder 300 may calculate two upsampled reference pixel values, refpix_a and refpix_b, and then calculate the prediction pixel value according to Clip(0, max_pixel_value, Round2(refpix_a*(32−shift)+refpix_b*shift, 5)).

Additional details regarding the calculation of prediction pixels using the techniques of this disclosure are described below. These detailed techniques represent an example modification to the original intra prediction techniques of AV1. Video encoder 200 and video decoder 300 may be configured to perform techniques according to the following pseudocode to calculate values for prediction pixels of a prediction block according to the techniques of this disclosure.

2a. If (plane=luma) pAngle=Base_Angle_Y+ANGLE_STEP*AngleDelta_Y;
Else pAngle=Base_Angle_UV+ANGLE_STEP*AngleDelta_UV;
2b. If enable_intra-edge_filter=1, then:
If pAngle not 90 or 180 degrees, then:
If pAngle between 90 and 180 degrees, and (block_width+block_height>=24), Filter corner process is invoked where:
New_top_left_pixel=Round2(5*topmost_left_neighboring_pixel+current_top_left neighboring pixel+5*leftmost_top_neighboring_pixel,
If Top pixels available, then:
Find top filter strength using Section 7.11.2.9 of AV1 Specification with Angle=abs(pAngle−90), blkWh=(block_width+block_height) and filterType as inputs.
Set numPx=min(block_width, number of top neighbour pixels within the frame boundary)+(pAngle<90? Block_height: 0).
Do Multi-cycle Intra Edge filter process as given in Section 7.11.2.12 of AV1 Specification with top neighbor pixels, numPx and top filter strength as inputs.
If Left pixels available, then:
Find left filter strength using Section 7.11.2.9 of AV1 Specification with Angle=abs(pAngle−180), blkWh=(block_width+block_height) and filterType as inputs.
Set numPx=min(block_height, number of left neighbour pixels within the frame boundary)+(pAngle>180? Block_width: 0).
Do Multi-cycle Intra Edge filter process as given in Section 7.11.2.12 of AV1 Specification with left neighbor pixels, numPx and left filter strength as inputs.

<Modification to Conventional AV1>
Determine upsampleAbove and upsampleLeft as in the conventional AV1 techniques, but do not perform actual upsampling:
For top neighboring pixels: Evaluate upsampleAbove using Section 7.11.2.10 of the AV1 Specification with Angle=abs(pAngle−90), blkW=block_width, blkH=block_height, and filterType as inputs.
For left neighboring pixels: Evaluate upsampleLeft using Section 7.11.2.10 of the AV1 Specification with Angle=abs(pAngle−180), blkW=block_width, blkH=block_height, and filterType as inputs.
2.c Have a look-up table "Dr_Intra_Derivative" which would store position scalars dx and dy. Evaluate dx and dy as based on pAngle as give in Section 7.11.2.4 of the AV1 Specification, except for pAngles between 90 and 180, dx and dy are stored as −dx and −dy, respectively.
2d. Instead of three ways of prediction based on angular range, unify the equations to get two paths in parallel (one assuming base will be picked from top neighbors, another path assuming base will be picked from left neighbors):
Top neighbor path (i=column pos, j=row pos):
idxX=(j<<6)+(i+1)*dx (remember the dx will be negative for 90<pAngle<180)
maxBaseX=(w+h−1)<<upsampleAbove
baseX=min (maxBaseX, (idxX>>(6−upsampleAbove))
shiftX=((idxX<<upsampleAbove)>>1) & 0x1F
Left neighbor path (i=column pos, j=row pos):
idxY=(i<<6)+(j+1)*dy (remember the dy will be negative for 90<pAngle<180)
maxBaseY=(w+h−1)<<upsampleLeft
baseY=min (maxBaseY, (idxY>>(6−upsampleLeft))
shiftY=((idxY<<upsampleLeft)>>1) & 0x1F
Next, base=(baseX>=−(1<<upsampleAbove)) ? baseX: baseY;
Shift=(baseX>=−(1<<upsampleAbove)) ? shiftX: shiftY;
Top_sel=(baseX>=−(1<<upsampleAbove))
2e. If upsample is not enabled, then the base range is from −1 to blk_width−1.
Then select the base and base+1 pixels from AboveRow/LeftCol based on Top_sel.
However, if upsample is enabled, the base now projects on upsampled pixels according to the specification, i.e., its range now becomes −2 to 2*blk_width−2. Instead of upsampling AboveRow/LeftCol as in the conventional AV1 Specification, back-project base on the original AboveRow/LeftCol and find the corresponding pixels. This process is called Psuedo-upsampling. Start by finding:
Base_downsampled (base_ds)=base_original>>1;
Instead of picking one pixel at "base" position from the upsampled neighbors as in the AV1 Specification, 4 pixels may be picked in a pattern (This can happen within one cycle):
p0=original_neighbor_array[base_ds−1] (except for base_ds=−1),
p1=original_neighbor_array[base_ds],
p2=original_neighbor_array [base_ds+1],
p3=original_neighbor_array[base_ds+2].

Refpix_a=(base is odd) ? 9*(p1+p2)−(p0+p3):p1
Refpix_b=(base is odd) ? p2:9*(p1+p2)−(p0+p3)
pred[i][j]=Clip(0, max_pixel_value, Round2(refpix_a*
(32−shift)+refpix_b*shift, 5)).
</Modification to Conventional AV1>

Thus, instead of upsampling all of the original neighbor pixels, video encoder 200 and video decoder 300 may pick only the required pixels for prediction and apply upsampling filter equations only to these selected pixels. In this manner, video encoder 200 and video decoder 300 may perform pseudo-upsampling of the reference pixels, instead of upsampling all neighboring pixels to the current block as in the AV1 Specification. Furthermore, according to the techniques of this disclosure, the total number of process steps/cycles taken is 8+M/N1, and the max storage size for storing the neighbor values is M. In this manner, the techniques of this disclosure reduce the needed storage size for storing the neighboring pixels, and reduce the number of processing steps/cycles, relative to conventional techniques of the AV1 Specification.

Differences between the techniques of this disclosure and the conventional techniques of the AV1 Specification may be summarized as follows. Contrary to the techniques of the AV1 Specification, the actual upsampling stage is removed. Instead, video encoder 200 and video decoder 300 may pseudo-upsample only the required pixels from the original neighbor buffer, without upsampling the other pixels. The Dr_Intra_Derivative Look-up table, per the techniques of this disclosure, may store negative dx and dy values for prediction angles (pAngle) between 90 and 180. This allows equations based on pAngle to be unified and the three-way prediction path (based on pAngle) of the AV1 Specification to become a two-way path (based on baseX>=−(1<<upsampleAbove)). Moreover, instead of picking "base" and "base+1" pixels from upsampled neighbors as in the AV1 Specification, video encoder 200 and video decoder 300 may select "base_ds−1", "base_ds", "base_ds+1" and "base_ds+2" neighbors from original pos-filtered neighbors, where base_ds=final_base>>1.

In this manner, the techniques of this disclosure may achieve the following advantages. Due to removal of the upsampling stage, these techniques may save M/N2 number of cycles, where M is the total number of neighbors and N2 is the number of pixels that would otherwise be upsampled per cycle. This can increase the speed of neighbor setup and prediction from 0% to 66% based on the values of M and N2. These techniques may also allow for a physical memory area reduction by almost 50%, since 2× upsampled pixels do not need to be stored. That is, video encoder 200 and video decoder 300 may only retain original neighbors during prediction. Thus, these techniques may reduce the relatively large buffer size that would otherwise be needed to perform the techniques of the AV1 Specification. Furthermore, these techniques may reduce the three-way prediction to a two-way prediction, which may improve the critical path delay and memory area. No extra multipliers and adders are needed for performing the third stage of the techniques of the AV1 Specification.

Certain examples of the techniques of this disclosure are summarized in the following clauses:

Clause 1: A method of decoding video data, the method comprising: determining that a current block of video data is to be predicted using an angular intra-prediction mode; determining neighboring samples to the current block that will be used to generate a prediction block for the current block according to an angle of the angular intra-prediction mode and that are to be upsampled; calculating predicted samples of the prediction block according to formulas that jointly upsample the neighboring samples that will be used to generate the prediction block and that generate the values for the predicted samples; and decoding the current block using the prediction block.

Clause 2: The method of clause 1, wherein calculating the predicted samples of the prediction block comprises: performing a top neighbor path calculation of the predicted samples using above-neighboring samples to the current block, including, for each sample of the prediction block: calculating an index X value idxX=(j<<6)+(i+1)*dx, wherein j represents a row position value for a current sample, i represents a column position value for the current sample, and dx represents a horizontal position scalar value according to the angle of the angular intra-prediction mode; calculating a max base X value according to maxBaseX=(w+h−1)<<upsampleAbove, wherein w represents a width of the current block, h represents a height of the current block, upsampleAbove represents a value indicating whether the above-neighboring samples are to be upsampled according to the determination of the neighboring samples that will be used to generate the prediction block and that are to be upsampled, and '<<' represents a bitwise left shift operator; calculating a base X value according to baseX=min (maxBaseX, (idxX>>(6−upsampleAbove))); and calculating a shift X value according to shiftX=((idxX<<upsampleAbove)>>1) & 0x1F, wherein '>>' represents a bitwise right shift operator and '&' represents a bitwise AND operator; performing a left neighbor path calculation of the predicted samples using left-neighboring samples to the current block, including, for each sample of the prediction block: calculating an index Y value idxY=(i<<6)+(j+1)*dy, wherein dy represents a vertical position scalar value according to the angle of the angular intra-prediction mode; calculating a max base Y value according to maxBaseY=(w+h−1)<<upsampleLeft, wherein upsampleLeft represents a value indicating whether the left-neighboring samples are to be upsampled according to the determination of the neighboring samples that will be used to generate the prediction block and that are to be upsampled; calculating a base Y value according to baseY=min (maxBaseY, (idxY>>(6−upsampleLeft))); and calculating a shift Y value according to shiftY=((idxY<<upsampleLeft)>>1) & 0x1F, wherein '>>' represents a bitwise right shift operator and '&' represents a bitwise AND operator; and for each sample of the prediction block: calculating a base position value according to base=(baseX>=−(1<<upsampleAbove)) ? baseX:baseY; calculating a shift value according to shift=(baseX>=−(1<<upsampleAbove)) ? shiftX:shiftY; and calculating a value for a prediction sample at position (i, j) in the prediction block using the base value and the shift value.

Clause 3: The method of clause 2, wherein calculating the value for the prediction sample at position (i, j) comprises: determining four adjacent samples according to the base position value for the prediction sample at position (i, j); and calculating the value for the prediction sample using the four adjacent samples.

Clause 4: The method of clause 3, wherein determining the four adjacent samples comprises determining the four adjacent samples as including p1 at the base position value minus 1, p2 at the base position, p3 at the base position value plus 1, and p4 at the base position value plus 2, and wherein calculating the value for the prediction sample using the four adjacent samples comprises: calculating a value refpix_a according to: when the base value is odd, refpix_a is equal to (9*(p1+p2)−(p0+p3)), or when the base value is even, refpix_a is equal to p1; calculating a value refpix_b according to: when the base value is odd, refpix_b is equal to p2, or when the base value is even, refpix_b is equal to (9*(p1+p2)−(p0+p3)); and calculating the value for the prediction sample at position (i, j) (pred[i][j]) according to pred[i][j]=Clip(0, max_pixel_value, Round2(refpix_a*(32−shift)+refpix_b*shift, 5)).

Clause 5: The method of any of clauses 1-4, further comprising encoding the current block using the prediction block prior to decoding the current block.

Clause 6: A device for decoding video data, the device comprising: a memory configured to store video data; and one or more processors implemented in circuitry and configured to: determine that a current block of the video data is to be predicted using an angular intra-prediction mode; determine neighboring samples to the current block that will be used to generate a prediction block for the current block according to an angle of the angular intra-prediction mode and that are to be upsampled; calculate predicted samples of the prediction block according to formulas that jointly upsample the neighboring samples that will be used to generate the prediction block and that generate the values for the predicted samples; and decode the current block using the prediction block.

Clause 7: The device of clause 6, wherein to calculate the predicted samples of the prediction block, the one or more processors are configured to: perform a top neighbor path calculation of the predicted samples using above-neighboring samples to the current block, including, for each sample of the prediction block: calculate an index X value idxX=(j<<6)+(i+1)*dx, wherein j represents a row position value for a current sample, i represents a column position value for the current sample, and dx represents a horizontal position scalar value according to the angle of the angular intra-prediction mode; calculate a max base X value according to maxBaseX=(w+h−1)<<upsampleAbove, wherein w represents a width of the current block, h represents a height of the current block, upsampleAbove represents a value indicating whether the above-neighboring samples are to be upsampled according to the determination of the neighboring samples that will be used to generate the prediction block and that are to be upsampled, and '<<' represents a bitwise left shift operator; calculate a base X value according to baseX=min (maxBaseX, (idxX>>(6−upsampleAbove))); and calculate a shift X value according to shiftX=((idxX<<upsampleAbove)>>1) & 0x1F, wherein '>>' represents a bitwise right shift operator and '&' represents a bitwise AND operator; perform a left neighbor path calculation of the predicted samples using left-neighboring samples to the current block, including, for each sample of the prediction block: calculate an index Y value idxY=(i<<6)+(j+1)*dy, wherein dy represents a vertical position scalar value according to the angle of the angular intra-prediction mode; calculate a max base Y value according to maxBaseY=(w+h−1)<<upsampleLeft, wherein upsampleLeft represents a value indicating whether the left-neighboring samples are to be upsampled according to the determination of the neighboring samples that will be used to generate the prediction block and that are to be upsampled; calculate a base Y value according to baseY=min (maxBaseY, (idxY>>(6−upsampleLeft))); and calculate a shift Y value according to shiftY=((idxY<<upsampleLeft)>>1) & 0x1F, wherein '>>' represents a bitwise right shift operator and '&' represents a bitwise AND operator; and for each sample of the prediction block: calculate a base position value according to base=(baseX>=−(1<<upsampleAbove)) ? baseX:baseY; calculate a shift value according to shift=(baseX>=−(1<<upsampleAbove)) ? shiftX:shiftY; and calculate a value for a prediction sample at position (i, j) in the prediction block using the base value and the shift value.

Clause 8: The device of clause 7, wherein to calculate the value for the prediction sample at position (i, j), the one or more processors are configured to: determine four adjacent samples according to the base position value for the prediction sample at position (i, j); and calculate the value for the prediction sample using the four adjacent samples.

Clause 9: The device of clause 8, wherein the one or more processors are configured to determine the four adjacent samples as including p1 at the base position value minus 1, p2 at the base position, p3 at the base position value plus 1, and p4 at the base position value plus 2, and wherein to calculate the value for the prediction sample using the four adjacent samples, the one or more processors are configured to: calculate a value refpix_a according to: when the base value is odd, refpix_a is equal to (9*(p1+p2)−(p0+p3)), or when the base value is even, refpix_a is equal to p1; calculate a value refpix_b according to: when the base value is odd, refpix_b is equal to p2, or when the base value is even, refpix_b is equal to (9*(p1+p2)−(p0+p3)); and calculate the value for the prediction sample at position (i, j) (pred[i][j]) according to pred[i][j]=Clip(0, max_pixel_value, Round2(refpix_a*(32−shift)+refpix_b*shift, 5)).

Clause 10: The device of any of clauses 6-9, wherein the one or more processors are configured to encode the current block using the prediction block prior to decoding the current block.

Clause 11: The device of any of clauses 6-10, further comprising a display configured to display the decoded video data.

Clause 12: The device of any of clauses 6-11, wherein the device comprises one or more of a camera, a computer, a mobile device, a broadcast receiver device, or a set-top box.

Clause 13: A computer-readable storage medium having stored thereon instructions that, when executed, cause a processor of a device for decoding video data to: determine that a current block of video data is to be predicted using an angular intra-prediction mode; determine neighboring samples to the current block that will be used to generate a prediction block for the current block according to an angle of the angular intra-prediction mode and that are to be upsampled; calculate predicted samples of the prediction block according to formulas that jointly upsample the neighboring samples that will be used to generate the prediction block and that generate the values for the predicted samples; and decode the current block using the prediction block.

Clause 14: The computer-readable storage medium of clause 13, wherein the instructions that cause the processor to calculate the predicted samples of the prediction block comprise instructions that cause the processor to: perform a top neighbor path calculation of the predicted samples using above-neighboring samples to the current block, including, for each sample of the prediction block: calculate an index X value idxX=(j<<6)+(i+1)*dx, wherein j represents a row position value for a current sample, i represents a column position value for the current sample, and dx represents a horizontal position scalar value according to the angle of the angular intra-prediction mode; calculate a max base X value according to maxBaseX=(w+h−1)<<upsampleAbove, wherein w represents a width of the current block, h represents a height of the current block, upsampleAbove represents a value indicating whether the above-neighboring samples are to be upsampled according to the determination of the neighboring samples that will be used to generate the prediction block and that are to be upsampled, and '<<' represents a bitwise left shift operator; calculate a base X value according to baseX=min (maxBaseX, (idxX>>(6−upsampleAbove))); and calculate a shift X value according to shiftX=((idxX<<upsampleAbove)>>1) & 0x1F, wherein '>>' represents a bitwise right shift operator and '&' represents a bitwise AND operator; perform a left neighbor path calculation of the predicted samples using left-neighboring samples to the current block, including, for each sample of the prediction block: calculate an index Y value idxY=(i<<6)+(j+1)*dy, wherein dy represents a vertical position scalar value according to the angle of the angular intra-prediction mode; calculate a max base Y value according to maxBaseY=(w+h−1)<<upsampleLeft, wherein upsampleLeft represents a value indicating whether the left-neighboring samples are to be upsampled according to the determination of the neighboring samples that will be used to generate the prediction block and that are to be upsampled; calculate a base Y value according to baseY=min (maxBaseY, (idxY>>(6−upsampleLeft))); and calculate a shift Y value according to shiftY=((idxY<<upsampleLeft)>>1) & 0x1F, wherein '>>' represents a bitwise right shift operator and '&' represents a bitwise AND operator; and for each sample of the prediction block: calculate a base position value according to base=(baseX>=−(1<<upsampleAbove)) ? baseX:baseY; calculate a shift value according to shift=(baseX>=−(1<<upsampleAbove)) ? shiftX:shiftY; and calculate a value for a prediction sample at position (i, j) in the prediction block using the base value and the shift value.

Clause 15: The computer-readable storage medium of clause 14, wherein the instructions that cause the processor to calculate the value for the prediction sample at position (i, j) comprise instructions that cause the processor to: determine four adjacent samples according to the base position value for the prediction sample at position (i, j); and calculate the value for the prediction sample using the four adjacent samples.

Clause 16: The computer-readable storage medium of clause 15, wherein the instructions that cause the processor to determine the four adjacent samples comprise instructions that cause the processor to determine the four adjacent samples as including p1 at the base position value minus 1, p2 at the base position, p3 at the base position value plus 1, and p4 at the base position value plus 2, and wherein the instructions that cause the processor to calculate the value for the prediction sample using the four adjacent samples comprise instructions that cause the processor to: calculate a value refpix_a according to: when the base value is odd, refpix_a is equal to (9*(p1+p2)−(p0+p3)), or when the base value is even, refpix_a is equal to p1; calculate a value refpix_b according to: when the base value is odd, refpix_b is equal to p2, or when the base value is even, refpix_b is equal to (9*(p1+p2)−(p0+p3)); and calculate the value for the prediction sample at position (i, j) (pred[i][j]) according to pred[i][j]=Clip(0, max_pixel_value, Round2(refpix_a*(32−shift)+refpix_b*shift, 5)).

Clause 17: The computer-readable storage medium of any of clauses 13-16, further comprising instructions that cause the processor to encode the current block using the prediction block prior to decoding the current block.

Clause 18: A device for decoding video data, the device comprising: means for determining that a current block of video data is to be predicted using an angular intra-prediction mode; means for determining neighboring samples to the current block that will be used to generate a prediction block for the current block according to an angle of the angular intra-prediction mode and that are to be upsampled; means for calculating predicted samples of the prediction block according to formulas that jointly upsample the neighboring samples that will be used to generate the prediction block and that generate the values for the predicted samples; and means for decoding the current block using the prediction block.

Clause 19: The device of clause 18, wherein the means for calculating the predicted samples of the prediction block comprises: means for performing a top neighbor path calculation of the predicted samples using above-neighboring samples to the current block, including, for each sample of the prediction block: means for calculating an index X value idxX=(j<<6)+(i+1)*dx, wherein j represents a row position value for a current sample, i represents a column position value for the current sample, and dx represents a horizontal position scalar value according to the angle of the angular intra-prediction mode; means for calculating a max base X value according to maxBaseX=(w+h−1)<<upsampleAbove, wherein w represents a width of the current block, h represents a height of the current block, upsampleAbove represents a value indicating whether the above-neighboring samples are to be upsampled according to the determination of the neighboring samples that will be used to generate the prediction block and that are to be upsampled, and '<<' represents a bitwise left shift operator; means for calculating a base X value according to baseX=min (max BaseX, (idxX>>(6−upsampleAbove))); and means for calculating a shift X value according to shiftX=((idxX<<upsampleAbove)>>1) & 0x1F, wherein '>>' represents a bitwise right shift operator and '&' represents a bitwise AND operator; means for performing a left neighbor path calculation of the predicted samples using left-neighboring samples to the current block, including, for each sample of the prediction block: means for calculating an index Y value idxY=(i<<6)+(j+1)*dy, wherein dy represents a vertical position scalar value according to the angle of the angular intra-prediction mode; means for calculating a max base Y value according to maxBaseY=(w+h−1)<<upsampleLeft, wherein upsampleLeft represents a value indicating whether the left-neighboring samples are to be upsampled according to the determination of the neighboring samples that will be used to generate the prediction block and that are to be upsampled; means for calculating a base Y value according to baseY=min (maxBaseY, (idxY>>(6−upsampleLeft))); and means for calculating a shift Y value according to shiftY=((idxY<<upsampleLeft)>>1) & 0x1F, wherein '>>' represents a bitwise right shift operator and '&' represents a bitwise AND operator; and means for calculating, for each sample of the prediction block, a base position value according to base=(baseX>=−(1<<upsampleAbove)) ? baseX:baseY; means for calculating, for each sample of the prediction block, a shift value according to shift=(baseX>=−(1<<upsampleAbove)) ? shiftX:shiftY; and means for calculating, for each sample of the prediction block, a value for a prediction sample at position (i, j) in the prediction block using the base value and the shift value.

Clause 20: The device of clause 19, wherein the means for calculating the value for the prediction sample at position (i, j) comprises: means for determining four adjacent samples according to the base position value for the prediction sample at position (i, j); and means for calculating the value for the prediction sample using the four adjacent samples.

Clause 21: The device of clause 20, wherein the means for determining the four adjacent samples comprises means for determining the four adjacent samples as including p1 at the base position value minus 1, p2 at the base position, p3 at the base position value plus 1, and p4 at the base position value plus 2, and wherein the means for calculating the value for the prediction sample using the four adjacent samples comprises: means for calculating a value refpix_a according to: when the base value is odd, refpix_a is equal to (9*(p1+p2)−(p0+p3)), or when the base value is even, refpix_a is equal to p1; means for calculating a value refpix_b according to: when the base value is odd, refpix_b is equal to p2, or when the base value is even, refpix_b is equal to (9*(p1+p2)−(p0+p3)); and means for calculating the value for the prediction sample at position (i, j) (pred[i][j]) according to pred[i][j]=Clip(0, max_pixel_value, Round2(refpix_a*(32−shift)+refpix_b*shift, 5)).

Clause 22: The device of any of clauses 18-21, further comprising means for encoding the current block using the prediction block prior to decoding the current block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

determining that a current block of video data is to be predicted using an angular intra-prediction mode;

determining neighboring samples to the current block that will be used to generate a prediction block for the current block according to an angle of the angular intra-prediction mode and that are to be upsampled;

calculating values for prediction samples of the prediction block according to formulas that jointly upsample the neighboring samples that will be used to generate the prediction block and that generate the values for the prediction samples, wherein calculating the values for the prediction samples includes, for each of the prediction samples of the prediction block;

calculating an index X value according to idxX= (j<<6)+(i+1)*dx, wherein j represents a row position value for a current sample, '<<' represents a bitwise left shift operator, i represents a column position value for the current sample, and dx represents a horizontal position scalar value according to the angle of the angular intra-prediction mode;

calculating a base X value according to baseX= (idxX>>(6−upsampleAbove)), wherein upsampleAbove represents a value indicating whether the above-neighboring samples are to be upsampled according to the determination of the neighboring samples that will be used to generate the prediction block and that are to be upsampled, and '>>' represents a bitwise right shift operator;

when baseX is greater than or equal to −(1<<upsampleAbove):

calculating a shift X value according to shiftX= ((idxX<<upsampleAbove)>>1) & 0x1F, wherein '>>' represents a bitwise right shift operator and '&' represents a bitwise AND operator; and calculating a value for the prediction sample at position (i, j) in the prediction block using the baseX value and the shiftX value; or when baseX is less than −(1<<upsampleAbove):

calculating an index Y value according to value idxY=(i<<6)+(j+1)*dy, wherein dy represents a vertical position scalar value according to the angle of the angular intra-prediction mode;

calculating a base Y value according to baseY= (idxY>>(6−upsampleLeft)), wherein upsampleLeft represents a value indicating whether the left-neighboring samples are to be upsampled according to the determination of the neighboring samples that will be used to generate the prediction block and that are to be upsampled;

calculating a shift Y value according to shiftY= ((idxY<<upsampleLeft)>>1) & 0x1F, wherein '>>' represents a bitwise right shift operator and '&' represents a bitwise AND operator; and calculating the value for the prediction sample at position (i, j) in the prediction block using the baseY value and the shiftY value; and decoding the current block using the prediction block.

2. The method of claim 1, wherein calculating the values for the prediction samples of the prediction block further comprises:

performing a top neighbor path calculation of the values for the prediction samples using above-neighboring samples to the current block, including, for each of the prediction samples of the prediction block:
  calculating the index X value idxX;
  calculating a max base X value according to maxBaseX=(w+h−1)<<upsampleAbove, wherein w represents a width of the current block, and h represents a height of the current block;
  calculating the base X value; and
  calculating the shift X value;

performing a left neighbor path calculation of the values for the prediction samples using left-neighboring samples to the current block, including, for each of the prediction samples of the prediction block:
  calculating the index Y value idxY;
  calculating a max base Y value according to maxBaseY=(w+h−1)<<upsampleLeft;
  calculating the base Y value; and
  calculating the shift Y value; and for each of the prediction samples of the prediction block:
  calculating a base position value according to base= (baseX>=−(1<<upsampleAbove)) ? baseX:baseY;
  calculating a shift value according to shift=(baseX>=− (1<<upsampleAbove)) ? shiftX:shiftY; and
  calculating the value for the prediction sample at position (i, j) in the prediction block using the base position value and the shift value.

3. The method of claim 2, wherein calculating the value for the prediction sample at position (i, j) comprises:

determining four adjacent samples according to the base position value for the prediction sample at position (i, j); and calculating the value for the prediction sample using the four adjacent samples.

4. The method of claim 3,
wherein determining the four adjacent samples comprises determining the four adjacent samples as including p1 at the base position value minus 1, p2 at the base position, p3 at the base position value plus 1, and p4 at the base position value plus 2, and wherein calculating the value for the prediction sample using the four adjacent samples comprises:
  calculating a value refpix_a according to:
    when the base value is odd, refpix_a is equal to (9*(p1+p2)−(p0+p3)), or
    when the base value is even, refpix_a is equal to p1;
  calculating a value refpix_b according to:
    when the base value is odd, refpix_b is equal to p2, or
    when the base value is even, refpix_b is equal to (9*(p1+p2)−(p0+p3)); and
  calculating the value for the prediction sample at position (i, j) (pred[i][j]) according to pred[i][j]=Clip(0, max_pixel_value, Round2(refpix_a*(32−shift)+ refpix_b*shift, 5)).

5. The method of claim 1, further comprising encoding the current block using the prediction block prior to decoding the current block.

6. A device for decoding video data, the device comprising:

a memory configured to store video data; and
one or more processors implemented in circuitry and configured to:
  determine that a current block of the video data is to be predicted using an angular intra-prediction mode;
  determine neighboring samples to the current block that will be used to generate a prediction block for the current block according to an angle of the angular intra-prediction mode and that are to be upsampled;
  calculate values for prediction samples of the prediction block according to formulas that jointly upsample the neighboring samples that will be used to generate the prediction block and that generate the values for the prediction samples, wherein to calculate the values for the prediction samples, the one or more processors are configured to, for each of the prediction samples of the prediction block:
    calculate an index X value according to idxX= (j<<6)+(i+1)*dx, wherein j represents a row position value for a current sample, '<<' represents a bitwise left shift operator, i represents a column position value for the current sample, and dx represents a horizontal position scalar value according to the angle of the angular intra-prediction mode;
    calculate a base X value according to baseX= (idxX>>(6−upsampleAbove)), wherein upsampleAbove represents a value indicating whether the above-neighboring samples are to be upsampled according to the determination of the neighboring samples that will be used to generate the prediction block and that are to be upsampled, and '>>' represents a bitwise right shift operator;
    when baseX is greater than or equal to −(1<<upsampleAbove):
      calculate a shift X value according to shiftX= ((idxX upsampleAbove)>>1) & 0x1F, wherein '>>' represents a bitwise right shift operator and '&' represents a bitwise AND operator; and
      calculate a value for the prediction sample at position (i, j) in the prediction block using the baseX value and the shiftX value; or
    when baseX is less than −(1<<upsampleAbove):
      calculate an index Y value according to value idxY=(i<<6)+(j+1)*dy, wherein dy represents a vertical position scalar value according to the angle of the angular intra-prediction mode;

calculate a base Y value according to baseY= (idxY>>(6−upsampleLeft)), wherein upsampleLeft represents a value indicating whether the left-neighboring samples are to be upsampled according to the determination of the neighboring samples that will be used to generate the prediction block and that are to be upsampled;

calculate a shift Y value according to shiftY= ((idxY<<upsampleLeft)>>1) & 0x1F, wherein '>>' represents a bitwise right shift operator and '&' represents a bitwise AND operator; and calculate the value for the prediction sample at position (i, j) in the prediction block using the baseY value and the shiftY value; and decode the current block using the prediction block.

7. The device of claim 6, wherein to calculate the values for the prediction samples of the prediction block, the one or more processors are configured to:

perform a top neighbor path calculation of the values for the prediction samples using above-neighboring samples to the current block, including, for each of the prediction samples of the prediction block:
calculate the index X value idxX;
calculate a max base X value according to maxBaseX= (w+h−1)<<upsampleAbove, wherein w represents a width of the current block, and h represents a height of the current block;
calculate the base X value; and
calculate the shift X value;

perform a left neighbor path calculation of the values for the prediction samples using left-neighboring samples to the current block, including, for each of the prediction samples of the prediction block:
calculate the index Y value idxY;
calculate a max base Y value according to maxBaseY= (w+h−1)<<upsampleLeft;
calculate the base Y value; and
calculate the shift Y value; and for each of the prediction samples of the prediction block:
calculate a base position value according to base= (baseX>=−(1<<upsampleAbove)) ? baseX:baseY;
calculate a shift value according to shift=(baseX>=− (1<<upsampleAbove)) ? shiftX:shiftY; and
calculate a value for the prediction sample at position (i, j) in the prediction block using the base value and the shift value.

8. The device of claim 7, wherein to calculate the value for the prediction sample at position (i, j), the one or more processors are configured to:
determine four adjacent samples according to the base position value for the prediction sample at position (i, j); and
calculate the value for the prediction sample using the four adjacent samples.

9. The device of claim 8,
wherein the one or more processors are configured to determine the four adjacent samples as including p1 at the base position value minus 1, p2 at the base position, p3 at the base position value plus 1, and p4 at the base position value plus 2, and
wherein to calculate the value for the prediction sample using the four adjacent samples, the one or more processors are configured to:
calculate a value refpix_a according to:
when the base value is odd, refpix_a is equal to (9*(p1+p2)−(p0+p3)), or when the base value is even, refpix_a is equal to p1;
calculate a value refpix_b according to:
when the base value is odd, refpix_b is equal to p2, or
when the base value is even, refpix_b is equal to (9*(p1+p2)−(p0+p3)); and
calculate the value for the prediction sample at position (i, j) (pred[i][j]) according to pred[i][j]=Clip(0, max_pixel_value, Round2(refpix_a*(32−shift)+ refpix_b*shift, 5)).

10. The device of claim 6, wherein the one or more processors are configured to encode the current block using the prediction block prior to decoding the current block.

11. The device of claim 6, further comprising a display configured to display the decoded video data.

12. The device of claim 6, wherein the device comprises one or more of a camera, a computer, a mobile device, a broadcast receiver device, or a set-top box.

13. A non-transitory computer-readable storage medium having stored thereon instructions that, when executed, cause a processor of a device for decoding video data to:
determine that a current block of video data is to be predicted using an angular intra-prediction mode;
determine neighboring samples to the current block that will be used to generate a prediction block for the current block according to an angle of the angular intra-prediction mode and that are to be upsampled;
calculate values for prediction samples of the prediction block according to formulas that jointly upsample the neighboring samples that will be used to generate the prediction block and that generate the values for the prediction samples, wherein the instructions that cause the processor to calculate the values for the prediction samples include instructions that cause the processor to, for each of the prediction samples of the prediction block;
calculate an index X value according to idxX=(j<<6)+ (i+1)*dx, wherein j represents a row position value for a current sample, '<<' represents a bitwise left shift operator, i represents a column position value for the current sample, and dx represents a horizontal position scalar value according to the angle of the angular intra-prediction mode;
calculate a base X value according to baseX=(idxX>> (6−upsampleAbove)), wherein upsampleAbove represents a value indicating whether the above-neighboring samples are to be upsampled according to the determination of the neighboring samples that will be used to generate the prediction block and that are to be upsampled, and '>>' represents a bitwise right shift operator;
when baseX is greater than or equal to −(1<<upsample-Above):
calculate a shift X value according to shiftX= ((idxX<<upsampleAbove)>>1) & 0x1F, wherein '>>' represents a bitwise right shift operator and '&' represents a bitwise AND operator; and
calculate a value for the prediction sample at position (i, j) in the prediction block using the baseX value and the shiftX value; or
when baseX is less than −(1<<upsampleAbove):
calculate an index Y value according to value idxY= (i<<6)+(j+1)*dy, wherein dy represents a vertical position scalar value according to the angle of the angular intra-prediction mode;
calculate a base Y value according to baseY= (idxY>>(6−upsampleLeft)), wherein upsampleLeft represents a value indicating whether the left-neighboring samples are to be upsampled according to the determination of the neighboring samples that will be used to generate the prediction block and that are to be upsampled;

calculate a shift Y value according to shiftY=((idxY<<upsampleLeft)>>1) & 0x1F, wherein '>>' represents a bitwise right shift operator and '&' represents a bitwise AND operator; and calculate the value for the prediction sample at position (i, j) in the prediction block using the baseY value and the shiftY value; and decode the current block using the prediction block.

14. The non-transitory computer-readable storage medium of claim 13, wherein the instructions that cause the processor to calculate the values for the prediction samples of the prediction block comprise instructions that cause the processor to:

perform a top neighbor path calculation of the values for the prediction samples using above-neighboring samples to the current block, including, for each of the prediction samples of the prediction block:
calculate the index X value idxX;
calculate a max base X value according to maxBaseX=(w+h−1)<<upsampleAbove, wherein w represents a width of the current block, and h represents a height of the current block;
calculate the base X value; and
calculate the shift X value;

perform a left neighbor path calculation of the values for the prediction samples using left-neighboring samples to the current block, including, for each of the prediction samples of the prediction block:
calculate the index Y value idxY;
calculate a max base Y value according to maxBaseY=(w+h−1)<<upsampleLeft;
calculate the base Y value; and
calculate the shift Y value according to shiftY=((idxY<<upsampleLeft)>>1) & 0x1F, wherein; and for each of the prediction samples of the prediction block:
calculate a base position value according to base=(baseX>=−(1<<upsampleAbove)) ? baseX:baseY;
calculate a shift value according to shift=(baseX>=−(1<<upsampleAbove)) ? shiftX:shiftY; and
calculate a value for a prediction sample at position (i, j) in the prediction block using the base value and the shift value.

15. The non-transitory computer-readable storage medium of claim 14, wherein the instructions that cause the processor to calculate the value for the prediction sample at position (i, j) comprise instructions that cause the processor to:

determine four adjacent samples according to the base position value for the prediction sample at position (i, j); and calculate the value for the prediction sample using the four adjacent samples.

16. The non-transitory computer-readable storage medium of claim 15, wherein the instructions that cause the processor to determine the four adjacent samples comprise instructions that cause the processor to determine the four adjacent samples as including p1 at the base position value minus 1, p2 at the base position, p3 at the base position value plus 1, and p4 at the base position value plus 2, and wherein the instructions that cause the processor to calculate the value for the prediction sample using the four adjacent samples comprise instructions that cause the processor to:

calculate a value refpix_a according to:
when the base value is odd, refpix_a is equal to $(9*(p1+p2)-(p0+p3))$, or
when the base value is even, refpix_a is equal to p1;

calculate a value refpix_b according to:
when the base value is odd, refpix_b is equal to p2, or
when the base value is even, refpix_b is equal to $(9*(p1+p2)-(p0+p3))$; and calculate the value for the prediction sample at position (i, j) (pred[i][j]) according to pred[i][j]=max_pixel_value, Round2(refpix_a*(32−shift)+refpix_b*shift, 5)).

17. The non-transitory computer-readable storage medium of claim 13, further comprising instructions that cause the processor to encode the current block using the prediction block prior to decoding the current block.

18. A device for decoding video data, the device comprising:

means for determining that a current block of video data is to be predicted using an angular intra-prediction mode;

means for determining neighboring samples to the current block that will be used to generate a prediction block for the current block according to an angle of the angular intra-prediction mode and that are to be upsampled;

means for calculating values for prediction samples of the prediction block according to formulas that jointly upsample the neighboring samples that will be used to generate the prediction block and that generate the values for the prediction samples, including:

means for calculating an index X value according to idxX=(j<<6)+(i+1)*dx, wherein j represents a row position value for a current sample, '<<' represents a bitwise left shift operator, i represents a column position value for the current sample, and dx represents a horizontal position scalar value according to the angle of the angular intra-prediction mode;

means for calculating a base X value according to baseX=(idxX>>(6−upsampleAbove)), wherein upsampleAbove represents a value indicating whether the above-neighboring samples are to be upsampled according to the determination of the neighboring samples that will be used to generate the prediction block and that are to be upsampled, and '>>' represents a bitwise right shift operator;

means for calculating a shift X value according to shiftX=((idxX upsampleAbove)>>1) & 0x1F, wherein '>>' represents a bitwise right shift operator and '&' represents a bitwise AND operator when baseX is greater than or equal to −(1<<upsampleAbove);

means for calculating a value for the prediction sample at position (i, j) in the prediction block using the baseX value and the shiftX value when baseX is greater than or equal to −(1<<upsampleAbove);

means for calculating an index Y value according to value idxY=(i<<6)+(j+1)*dy, wherein dy represents a vertical position scalar value according to the angle of the angular intra-prediction mode when baseX is less than −(1<<upsampleAbove);

means for calculating a base Y value according to baseY=(idxY>>(6−upsampleLeft)), wherein upsampleLeft represents a value indicating whether the left-neighboring samples are to be upsampled according to the determination of the neighboring samples that will be used to generate the prediction block and that are to be upsampled when baseX is less than −(1<<upsampleAbove);

means for calculating a shift Y value according to shiftY=((idxY upsampleLeft)>>1) & 0x1F, wherein '>>' represents a bitwise right shift operator and '&' represents a bitwise AND operator when baseX is less than −(1<<upsampleAbove); and means for calculating the value for the prediction sample at position (i, j) in the prediction block using the baseY value and the shiftY value when baseX is less than −(1<<upsampleAbove); and means for decoding the current block using the prediction block.

19. The device of claim 18, wherein the means for calculating the values for the prediction samples of the prediction block comprises:

means for performing a top neighbor path calculation of the values for the prediction samples using above-neighboring samples to the current block, including: the means for calculating the index X value;

means for calculating a max base X value according to maxBaseX=(w+h−1)<<upsampleAbove, wherein w represents a width of the current block, and h represents a height of the current block;

means for calculating the base X value; and means for calculating the shift X value;

means for performing a left neighbor path calculation of the values for the prediction samples using left-neighboring samples to the current block, including:

means for calculating the index Y value idxY;

means for calculating a max base Y value according to maxBaseY=(w+h−1)<<upsampleLeft;

means for calculating the base Y value; and means for calculating the shift Y value; and means for calculating, for each of the prediction samples of the prediction block, a base position value according to base=(baseX>=−(1<<upsampleAbove)) ? baseX:baseY;

means for calculating, for each of the prediction samples of the prediction block, a shift value according to shift=(baseX>=−(1<<upsampleAbove)) ? shiftX: shiftY; and means for calculating, for each of the prediction samples of the prediction block, a value for a prediction sample at position (i, j) in the prediction block using the base value and the shift value.

20. The device of claim 19, wherein the means for calculating the value for the prediction sample at position (i, j) comprises:

means for determining four adjacent samples according to the base position value for the prediction sample at position (i, j); and means for calculating the value for the prediction sample using the four adjacent samples.

21. The device of claim 20, wherein the means for determining the four adjacent samples comprises means for determining the four adjacent samples as including p1 at the base position value minus 1, p2 at the base position, p3 at the base position value plus 1, and p4 at the base position value plus 2, and wherein the means for calculating the value for the prediction sample using the four adjacent samples comprises:

means for calculating a value refpix_a according to:
when the base value is odd, refpix_a is equal to (9*(p1+p2)−(p0+p3)), or
when the base value is even, refpix_a is equal to p1;

means for calculating a value refpix_b according to:
when the base value is odd, refpix_b is equal to p2, or
when the base value is even, refpix_b is equal to (9*(p1+p2)−(p0+p3)); and means for calculating the value for the prediction sample at position (i, j) (pred[i][j]) according to pred[i][j]=Clip(0, max_pixel_value, Round2 (refpix_a*(32−shift)+refpix_b*shift, 5)).

22. The device of claim 18, further comprising means for encoding the current block using the prediction block prior to decoding the current block.

23. A method of encoding video data, the method comprising:

determining that a current block of video data is to be predicted using an angular intra- prediction mode;

determining neighboring samples to the current block that will be used to generate a prediction block for the current block according to an angle of the angular intra-prediction mode and that are to be upsampled;

calculating values for prediction samples of the prediction block according to formulas that jointly upsample the neighboring samples that will be used to generate the prediction block and that generate the values for the prediction samples, wherein calculating the values for the prediction samples includes, for each of the prediction samples of the prediction block:

calculating an index X value according to idxX=(j<<6)+ (i+1)*dx, wherein j represents a row position value for a current sample, '<<' represents a bitwise left shift operator, i represents a column position value for the current sample, and dx represents a horizontal position scalar value according to the angle of the angular intra-prediction mode;

calculating a base X value according to baseX=(idxX>> (6−upsampleAbove)), wherein upsampleAbove represents a value indicating whether the above-neighboring samples are to be upsampled according to the determination of the neighboring samples that will be used to generate the prediction block and that are to be upsampled, and '>>' represents a bitwise right shift operator;

when baseX is greater than or equal to −(1<<upsampleAbove):

calculating a shift X value according to shiftX=((idxX <<upsampleAbove) >>1) & 0x1F, wherein '>>' represents a bitwise right shift operator and '&' represents a bitwise AND operator; and calculating a value for the prediction sample at position (i, j) in the prediction block using the baseX value and the shiftX value; or when baseX is less than −(1<<upsampleAbove):

calculating an index Y value according to value idxY= (i<<6)+(j+1)*dy, wherein dy represents a vertical position scalar value according to the angle of the angular intra-prediction mode;

calculating a base Y value according to base Y=(idxY >>(6−upsampleLeft)), wherein upsampleLeft represents a value indicating whether the left-neighboring samples are to be upsampled according to the determination of the neighboring samples that will be used to generate the prediction block and that are to be upsampled;

calculating a shift Y value according to shiftY= ((idxY<<upsampleLeft)>>1) & 0x1F, wherein '>>' represents a bitwise right shift operator and '&' represents a bitwise AND operator; and calculating the value for the prediction sample at position (i, j) in the prediction block using the baseY value and the shiftY value; and encoding the current block using the prediction block.

24. The method of claim 23, wherein calculating the values for the prediction samples of the prediction block further comprises:

performing a top neighbor path calculation of the values for the prediction samples using above-neighboring samples to the current block, including, for each of the prediction samples of the prediction block:

calculating the index X value idxX;

calculating a max base X value according to maxBaseX=(w+h−1)<<upsampleAbove, wherein w represents a width of the current block, and h represents a height of the current block;

calculating the base X value; and calculating the shift X value;

performing a left neighbor path calculation of the values for the prediction samples using left-neighboring samples to the current block, including, for each of the prediction samples of the prediction block:

calculating the index Y value idxY;

calculating a max base Y value according to maxBaseY=(w+h−1)<<upsampleLeft;

calculating the base Y value; and calculating the shift Y value; and for each of the prediction samples of the prediction block:

calculating a base position value according to base=(baseX>=−(1<<upsampleAbove))? baseX:baseY;

calculating a shift value according to shift=(baseX>=−(1<<upsampleAbove))? shiftX:shiftY; and calculating the value for the prediction sample at position (i, j) in the prediction block using the base position value and the shift value.

25. The method of claim 24, wherein calculating the value for the prediction sample at position (i, j) comprises:

determining four adjacent samples according to the base position value for the prediction sample at position (i, j); and calculating the value for the prediction sample using the four adjacent samples.

26. The method of claim 25, wherein determining the four adjacent samples comprises determining the four adjacent samples as including p1 at the base position value minus 1, p2 at the base position, p3 at the base position value plus 1, and p4 at the base position value plus 2, and wherein calculating the value for the prediction sample using the four adjacent samples comprises:

calculating a value refpix_a according to:

when the base value is odd, refpix_a is equal to (9*(p1+p2)−(p0+p3)), or when the base value is even, refpix_a is equal to p1;

calculating a value refpix_b according to:

when the base value is odd, refpix_b is equal to p2, or when the base value is even, refpix_b is equal to (9*(p1+p2)−(p0+p3)); and calculating the value for the prediction sample at position (i, j) (pred[i][j]) according to pred[i][j] =Clip(0, max pixel value, Round2(refpix_a*(32shift)+refpix_b*shift, 5)).

27. A device for encoding video data, the device comprising:

a memory configured to store video data; and one or more processors implemented in circuitry and configured to:

determine that a current block of the video data is to be predicted using an angular intra-prediction mode;

determine neighboring samples to the current block that will be used to generate a prediction block for the current block according to an angle of the angular intra-prediction mode and that are to be upsampled;

calculate values for prediction samples of the prediction block according to formulas that jointly upsample the neighboring samples that will be used to generate the prediction block and that generate the values for the prediction samples, wherein to calculate the values for the prediction samples, the one or more processors are configured to, for each of the prediction samples of the prediction block:

calculate an index X value according to idxX= (j<<6)+(i+1)*dx, wherein j represents a row position value for a current sample, '<<' represents a bitwise left shift operator, i represents a column position value for the current sample, and dx represents a horizontal position scalar value according to the angle of the angular intra-prediction mode;

calculate a base X value according to baseX= (idxX >>(6-upsampleAbove)), wherein upsampleAbove represents a value indicating whether the above-neighboring samples are to be upsampled according to the determination of the neighboring samples that will be used to generate the prediction block and that are to be upsampled, and '>>' represents a bitwise right shift operator;

when baseX is greater than or equal to −(1<<upsampleAbove):

calculate a shift X value according to shiftX= ((idxX <<upsampleAbove)>>1) & 0x1F, wherein '>>' represents a bitwise right shift operator and '&' represents a bitwise AND operator; and calculate a value for the prediction sample at position (i, j) in the prediction block using the baseX value and the shiftX value; or when baseX is less than −(1<<upsampleAbove):

calculate an index Y value according to value idxY=(i<<6)+(j+1)*dy, wherein dy represents a vertical position scalar value according to the angle of the angular intra-prediction mode;

calculate a base Y value according to baseY= (idxY>>(6-upsampleLeft)), wherein upsampleLeft represents a value indicating whether the left-neighboring samples are to be upsampled according to the determination of the neighboring samples that will be used to generate the prediction block and that are to be upsampled;

calculate a shift Y value according to shiftY= ((idxY<<upsampleLeft)>>1) & 0x1F, wherein '>>' represents a bitwise right shift operator and '&' represents a bitwise AND operator; and calculate the value for the prediction sample at position (i, j) in the prediction block using the baseY value and the shiftY value; and encode the current block using the prediction block.

28. The device of claim 27, wherein to calculate the values for the prediction samples of the prediction block, the one or more processors are configured to:

perform a top neighbor path calculation of the values for the prediction samples using above-neighboring samples to the current block, including, for each of the prediction samples of the prediction block:

calculate the index X value idxX;

calculate a max base X value according to maxBaseX= (w+h−1)<<upsampleAbove, wherein w represents a width of the current block, and h represents a height of the current block;

calculate the base X value; and calculate the shift X value;

perform a left neighbor path calculation of the values for the prediction samples using left-neighboring samples to the current block, including, for each of the prediction samples of the prediction block:

calculate the index Y value idxY;

calculate a max base Y value according to maxBaseY= (w+h−1)<<upsampleLeft;

calculate the base Y value; and calculate the shift Y value; and for each of the prediction samples of the prediction block:

calculate a base position value according to base= (baseX>=−(1<<upsampleAbove)) ? baseX:baseY;

calculate a shift value according to shift= (baseX >=−(1<<upsampleAbove))? shiftX:shiftY; and calculate a value for the prediction sample at position (i, j) in the prediction block using the base value and the shift value.

29. The device of claim 28, wherein to calculate the value for the prediction sample at position (i, j), the one or more processors are configured to:

determine four adjacent samples according to the base position value for the prediction sample at position (i, j); and calculate the value for the prediction sample using the four adjacent samples.

30. The device of claim 29, wherein the one or more processors are configured to determine the four adjacent samples as including p1 at the base position value minus 1, p2 at the base position, p3 at the base position value plus 1, and p4 at the base position value plus 2, and wherein to calculate the value for the prediction sample using the four adjacent samples, the one or more processors are configured to:

calculate a value refpix_a according to:

when the base value is odd, refpix_a is equal to (9*(p1+p2)−(p0+p3)), or when the base value is even, refpix_a is equal to p1;

calculate a value refpix_b according to:

when the base value is odd, refpix_b is equal to p2, or when the base value is even, refpix_b is equal to (9*(p1+p2)−(p0+p3)); and calculate the value for the prediction sample at position (i, j) (pred[i][j]) according to pred[i][j] =Clip(0, max pixel value, Round2(refpix_a*(32-shift)+ refpix_b*shift, 5)).

* * * * *